United States Patent
Shrestha et al.

(10) Patent No.: US 12,335,021 B2
(45) Date of Patent: Jun. 17, 2025

(54) TIMING SYNCHRONIZATION FOR NON-TERRESTRIAL NETWORK COMMUNICATIONS

(71) Applicant: QUALCOMM Incorporated, San Diego, CA (US)

(72) Inventors: Bharat Shrestha, San Diego, CA (US); Xiao Feng Wang, San Diego, CA (US); Harikumar Krishnamurthy, San Diego, CA (US); Liangping Ma, San Diego, CA (US); Changhwan Park, San Diego, CA (US); Umesh Phuyal, San Diego, CA (US); Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/884,458

(22) Filed: Aug. 9, 2022

(65) Prior Publication Data

US 2024/0056170 A1 Feb. 15, 2024

(51) Int. Cl.
*H04B 7/00* (2006.01)
*H04B 7/185* (2006.01)
*H04W 56/00* (2009.01)

(52) U.S. Cl.
CPC .... *H04B 7/18513* (2013.01); *H04W 56/0005* (2013.01)

(58) Field of Classification Search
CPC ......................... H04B 7/18513; H04W 56/0005
See application file for complete search history.

(56) References Cited

U.S. PATENT DOCUMENTS 11,856,631 B1 * 12/2023 Huang ................ H04W 36/249

FOREIGN PATENT DOCUMENTS

| EP | 3993519 A1 | 5/2022 |
| WO | WO-2022030962 A1 | 2/2022 |
| WO | WO-2022069156 A1 | 4/2022 |

OTHER PUBLICATIONS

International Search Report and Written Opinion—PCT/US2023/029326—ISA/EPO—Dec. 4, 2023.

* cited by examiner

*Primary Examiner* — Erika A Washington
(74) *Attorney, Agent, or Firm* — Holland & Hart LLP

(57) ABSTRACT

Methods, systems, and devices for wireless communication are described. A user equipment (UE) may receive a message from a first non-terrestrial network cell indicating cell synchronization information for a second non-terrestrial network cell. In some examples, the cell synchronization information may indicate whether the first non-terrestrial network cell and the second non-terrestrial network cell are synchronized at a reference point. Additionally, or alternatively, the cell synchronization information may indicate a timing offset value between a first uplink time synchronization reference point of the first non-terrestrial network cell and a second uplink time synchronization reference point of the second non-terrestrial network cell. The UE may calculate a timing associated with signaling from the second non-terrestrial network cell based at least in part on the cell synchronization information. The UE may receive one or more signals from the second non-terrestrial network cell based at least in part on the calculated timing.

20 Claims, 17 Drawing Sheets

TIMING SYNCHRONIZATION FOR NON-TERRESTRIAL NETWORK COMMUNICATIONS

FIELD OF TECHNOLOGY

The following relates to wireless communication, including timing synchronization for non-terrestrial network communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). A wireless communications system may support communications between a UE and non-terrestrial devices, such as satellites that are associated with one or more non-terrestrial cells.

SUMMARY

The described techniques relate to improved methods, systems, devices, and apparatuses that support timing synchronization for non-terrestrial network communications. For example, the described techniques provide for a first non-terrestrial network cell to determine synchronization information associated with a second non-terrestrial network cell. A UE may receive a message from the first non-terrestrial network cell indicating cell synchronization information for the second non-terrestrial network cell. In some examples, the cell synchronization information may indicate whether the first non-terrestrial network cell and the second non-terrestrial network cell are synchronized at a reference point. Additionally, or alternatively, the cell synchronization information may indicate a timing offset value between a first uplink time synchronization reference point of the first non-terrestrial network cell and a second uplink time synchronization reference point of the second non-terrestrial network cell. The UE may calculate a timing associated with signaling from the second non-terrestrial network cell based on the cell synchronization information. The UE may monitor for and receive one or more signals from the second non-terrestrial network cell based at least in part on the calculated timing.

A method for wireless communication at a UE in communication with a first non-terrestrial network cell is described. The method may include receiving a message indicating cell synchronization information for a second non-terrestrial network cell, the cell synchronization information indicating whether the first non-terrestrial network cell and the second non-terrestrial network cell are synchronized at a reference point, calculating a timing associated with signaling from the second non-terrestrial network cell based on the cell synchronization information, and receiving one or more signals from the second non-terrestrial network cell based on the calculated timing.

An apparatus for wireless communication at a UE in communication with a first non-terrestrial network cell is described. The apparatus may include a processor, memory coupled with the processor, and instructions stored in the memory. The instructions may be executable by the processor to cause the apparatus to receive a message indicating cell synchronization information for a second non-terrestrial network cell, the cell synchronization information indicating whether the first non-terrestrial network cell and the second non-terrestrial network cell are synchronized at a reference point, calculate a timing associated with signaling from the second non-terrestrial network cell based on the cell synchronization information, and receive one or more signals from the second non-terrestrial network cell based on the calculated timing.

Another apparatus for wireless communication at a UE in communication with a first non-terrestrial network cell is described. The apparatus may include means for receiving a message indicating cell synchronization information for a second non-terrestrial network cell, the cell synchronization information indicating whether the first non-terrestrial network cell and the second non-terrestrial network cell are synchronized at a reference point, means for calculating a timing associated with signaling from the second non-terrestrial network cell based on the cell synchronization information, and means for receiving one or more signals from the second non-terrestrial network cell based on the calculated timing.

A non-transitory computer-readable medium storing code for wireless communication at a UE in communication with a first non-terrestrial network cell is described. The code may include instructions executable by a processor to receive a message indicating cell synchronization information for a second non-terrestrial network cell, the cell synchronization information indicating whether the first non-terrestrial network cell and the second non-terrestrial network cell are synchronized at a reference point, calculate a timing associated with signaling from the second non-terrestrial network cell based on the cell synchronization information, and receive one or more signals from the second non-terrestrial network cell based on the calculated timing.

In some examples of the method, apparatuses, and non-transitory computer-readable medium described herein, calculating the timing may include operations, features, means, or instructions for calculating the timing based on a first uplink time synchronization reference point of the first non-terrestrial network cell being synchronized with a second uplink time synchronization reference point of the second non-terrestrial network cell, where the cell synchronization information indicates that the first uplink time synchronization reference point and the second uplink time synchronization reference point may be synchronized.

In some examples of the method, apparatuses, and non-transitory computer-readable medium described herein, calculating the timing may include operations, features, means, or instructions for calculating the timing based on a timing offset value between a first uplink time synchronization reference point of the first non-terrestrial network cell and a second uplink time synchronization reference point of the second non-terrestrial network cell, where the cell synchronization information indicates the timing offset.

In some examples of the method, apparatuses, and non-transitory computer-readable medium described herein, the timing offset value includes a system frame number, a subframe, a slot number, or any combination thereof.

In some examples of the method, apparatuses, and non-transitory computer-readable medium described herein, receiving the message may include operations, features, means, or instructions for receiving the message from the first non-terrestrial network cell, the message including a measurement object configuration for a set of one or more non-terrestrial network cells including the second non-terrestrial network cell.

Some examples of the method, apparatuses, and non-transitory computer-readable medium described herein may further include operations, features, means, or instructions for determining that a first uplink time synchronization reference point of the first non-terrestrial network cell may be synchronized with a second uplink time synchronization reference point of the second non-terrestrial network cell based on the message excluding an indication of a timing offset value.

In some examples of the method, apparatuses, and non-transitory computer-readable medium described herein, calculating the timing may include operations, features, means, or instructions for calculating the timing based on a timing difference between downlink transmissions of the first non-terrestrial network cell and downlink transmissions of the second non-terrestrial network cell, the timing difference being based on a first reference point of the first non-terrestrial network cell and a second reference point of the second non-terrestrial network cell, where the cell synchronization information indicates the timing difference.

In some examples of the method, apparatuses, and non-transitory computer-readable medium described herein, the first reference point includes a first satellite, or a first platform, or both, providing a first service link for the first non-terrestrial network cell and the second reference point includes a second satellite, or a second platform, or both, providing a second service link for the second non-terrestrial network cell, the second service link being different from the first service link.

In some examples of the method, apparatuses, and non-transitory computer-readable medium described herein, calculating the timing may include operations, features, means, or instructions for calculating the timing based on a timing offset between a first synchronization signal block arrival time at a first network node of the first non-terrestrial network cell and a second synchronization signal block arrival time at a second network node of the second non-terrestrial network cell, where the cell synchronization information indicates the timing offset.

In some examples of the method, apparatuses, and non-transitory computer-readable medium described herein, the timing offset may be based on an epoch time of the first network node, a reference time, or both.

In some examples of the method, apparatuses, and non-transitory computer-readable medium described herein, the first network node includes a first satellite or a first platform providing a first service link for the first non-terrestrial network cell and the second network node includes a second satellite or a second platform providing a second service link for the second non-terrestrial network cell, the second service link being different from the first service link.

In some examples of the method, apparatuses, and non-transitory computer-readable medium described herein, calculating the timing may include operations, features, means, or instructions for calculating the timing based on a transmission time for synchronization signal blocks transmitted by a network node associated with the second non-terrestrial network cell, where the cell synchronization information indicates the transmission time.

In some examples of the method, apparatuses, and non-transitory computer-readable medium described herein, the transmission time indicates a system frame number and a subframe based on a timing of the first non-terrestrial network cell.

In some examples of the method, apparatuses, and non-transitory computer-readable medium described herein, the message includes a radio resource control message from the first non-terrestrial network cell.

In some examples of the method, apparatuses, and non-transitory computer-readable medium described herein, the message includes a handover message from the second non-terrestrial network cell.

In some examples of the method, apparatuses, and non-transitory computer-readable medium described herein, the message further indicates a reception time associated with a time when the first non-terrestrial network cell received a handover command from the second non-terrestrial network cell prior to the first non-terrestrial network cell transmitting the message to the UE.

In some examples of the method, apparatuses, and non-transitory computer-readable medium described herein, the message includes a system information message from the first non-terrestrial network cell or the second non-terrestrial network cell.

A method for wireless communication at a network node associated with a first non-terrestrial network cell is described. The method may include determining one or more timing parameters of a second non-terrestrial network cell different from the first non-terrestrial network cell and transmitting a message indicating cell synchronization information for the second non-terrestrial network cell, the cell synchronization information indicating whether the first non-terrestrial network cell and the second non-terrestrial network cell are synchronized at a reference point based on the one or more timing parameters.

An apparatus for wireless communication at a network node associated with a first non-terrestrial network cell is described. The apparatus may include a processor, memory coupled with the processor, and instructions stored in the memory. The instructions may be executable by the processor to cause the apparatus to determine one or more timing parameters of a second non-terrestrial network cell different from the first non-terrestrial network cell and transmit a message indicating cell synchronization information for the second non-terrestrial network cell, the cell synchronization information indicating whether the first non-terrestrial network cell and the second non-terrestrial network cell are synchronized at a reference point based on the one or more timing parameters.

Another apparatus for wireless communication at a network node associated with a first non-terrestrial network cell is described. The apparatus may include means for determining one or more timing parameters of a second non-terrestrial network cell different from the first non-terrestrial network cell and means for transmitting a message indicating cell synchronization information for the second non-terrestrial network cell, the cell synchronization information indicating whether the first non-terrestrial network cell and the second non-terrestrial network cell are synchronized at a reference point based on the one or more timing parameters.

A non-transitory computer-readable medium storing code for wireless communication at a network node associated with a first non-terrestrial network cell is described. The code may include instructions executable by a processor to determine one or more timing parameters of a second non-terrestrial network cell different from the first non-terrestrial network cell and transmit a message indicating cell synchronization information for the second non-terrestrial network cell, the cell synchronization information indicating whether the first non-terrestrial network cell and the second non-terrestrial network cell are synchronized at a reference point based on the one or more timing parameters.

In some examples of the method, apparatuses, and non-transitory computer-readable medium described herein, determining the one or more timing parameters may include operations, features, means, or instructions for determining that a first uplink time synchronization reference point of the first non-terrestrial network cell may be synchronized with a second uplink time synchronization reference point of the second non-terrestrial network cell, where the cell synchronization information indicates that the first uplink time synchronization reference point and the second uplink time synchronization reference point may be synchronized.

In some examples of the method, apparatuses, and non-transitory computer-readable medium described herein, determining the one or more timing parameters may include operations, features, means, or instructions for generating a timing offset value corresponding to a difference between a first uplink time synchronization reference point of the first non-terrestrial network cell and a second uplink time synchronization reference point of the second non-terrestrial network cell, where the cell synchronization information indicates the timing offset value.

In some examples of the method, apparatuses, and non-transitory computer-readable medium described herein, the timing offset value includes a system frame number, a subframe, a slot number, or any combination thereof.

In some examples of the method, apparatuses, and non-transitory computer-readable medium described herein, the message includes a measurement object configuration for a set of one or more non-terrestrial network cells including the second non-terrestrial network cell.

In some examples of the method, apparatuses, and non-transitory computer-readable medium described herein, determining the one or more timing parameters may include operations, features, means, or instructions for calculating a timing difference between downlink transmissions of the first non-terrestrial network cell and downlink transmissions of the second non-terrestrial network cell, the timing difference being based on a first reference point of the first non-terrestrial network cell and a second reference point of the second non-terrestrial network cell, where the cell synchronization information indicates the timing difference.

In some examples of the method, apparatuses, and non-transitory computer-readable medium described herein, the first reference point includes a first satellite, or a first platform, or both, providing a first service link for the first non-terrestrial network cell and the second reference point includes a second satellite, or a second platform, or both, providing a second service link for the second non-terrestrial network cell, the second service link being different from the first service link.

In some examples of the method, apparatuses, and non-transitory computer-readable medium described herein, determining the one or more timing parameters may include operations, features, means, or instructions for determining a timing offset between a first synchronization signal block arrival time at a first network node of the first non-terrestrial network cell and a second synchronization signal block arrival time at a second network node of the second non-terrestrial network cell, where the cell synchronization information indicates the timing offset.

In some examples of the method, apparatuses, and non-transitory computer-readable medium described herein, the timing offset may be based on an epoch time of the first network node, a reference time, or both.

In some examples of the method, apparatuses, and non-transitory computer-readable medium described herein, the first network node includes a first satellite or a first platform providing a first service link for the first non-terrestrial network cell and the second network node includes a second satellite or a second platform providing a second service link for the second non-terrestrial network cell, the second service link being different from the first service link.

In some examples of the method, apparatuses, and non-transitory computer-readable medium described herein, determining the one or more timing parameters may include operations, features, means, or instructions for determining a transmission time for synchronization signal blocks transmitted by a second network node associated with the second non-terrestrial network cell, where the cell synchronization information indicates the transmission time, the transmission time indicating a system frame number and a subframe based on a timing of the first non-terrestrial network cell.

DETAILED DESCRIPTION

Figure 1:
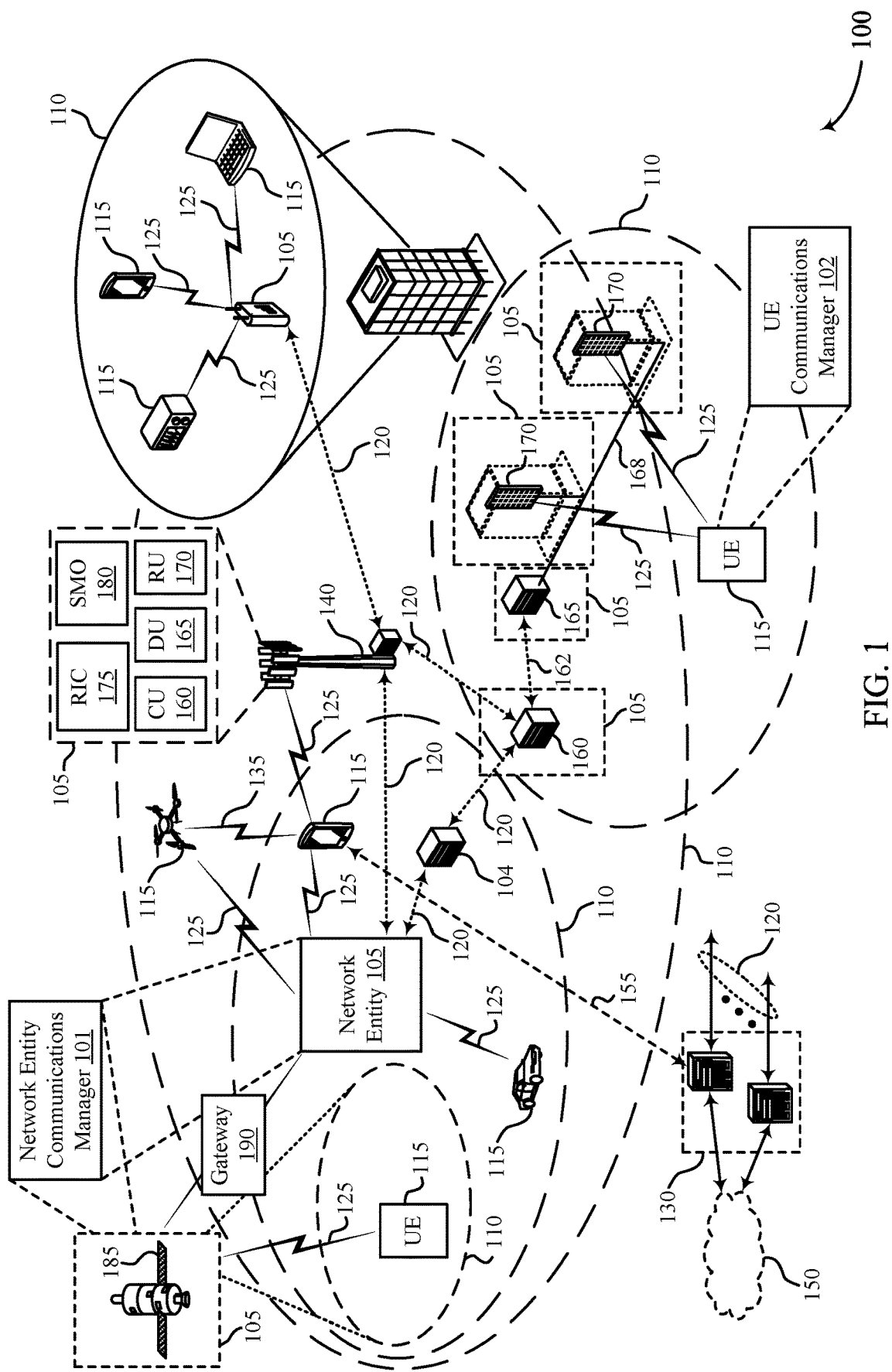
FIG. 1 illustrates an example of a wireless communications system that supports timing synchronization for non-terrestrial network communications in accordance with one or more aspects of the present disclosure.

Some wireless communications systems may support communications via non-terrestrial networks. A non-terrestrial network may refer to a network, or one or more segments of networks using radio frequency (RF) resources for communications between a UE and a satellite, between a UE and an unmanned aerial system (UAS) platform, or the like. For instance, a UE may communicate with a satellite via a service link, whereas the satellite may be connected to a gateway (e.g., a non-terrestrial network gateway) via a feeder link. The gateways may be co-located with or in communication with a network node such that signaling may be communicated between the network node and the UE via the gateway and the satellite. In such cases, a non-terrestrial network cell may be associated with one or more respective satellites, where each satellite may be associated with one or more gateways.

A non-terrestrial network entity may perform a handover procedure to transfer a UE from a serving cell of the non-terrestrial network entity to a target cell (e.g., a neighbor cell) of another non-terrestrial network entity. The non-terrestrial network entity may transmit a message (e.g., a handover command) to the UE indicating timing parameters associated with the target cell. The UE may use the received parameters to perform measurements in a configuration window and may monitor an information block associated with the target cell. However, the UE may not be aware of precise timing offset of the target cell with respect to the serving cell timing until the UE first decodes the information block. In such cases, the UE may perform blind decoding to detect the information block from the target cell, increasing power consumption. As such, the UE may benefit from additional timing information being provided to assist in the handover procedure.

Accordingly, techniques, systems, and devices described herein provide for a UE to receive timing information associated with a neighboring non-terrestrial network cell from a serving non-terrestrial network cell, which may be used during a handover procedure. For example, a serving non-terrestrial network entity and a target non-terrestrial network entity may be synchronized with respect to a synchronization reference point, and the serving non-terrestrial network entity or the target non-terrestrial network entity may transmit a message indicating synchronization information to the UE. Additionally, or alternatively, the serving non-terrestrial network entity or the target non-terrestrial network entity may transmit a message indicating a timing offset of an arrival time for an SSB associated with the target non-terrestrial network entity and an ephemeris, epoch time, or a reference time point. As such, the UE may detect an SSB during a handover procedure with higher reliability, which may improve power saving, connectivity, and communication resource efficiency.

Aspects of the disclosure are initially described in the context of wireless communications systems. Aspects of the disclosure are further illustrated by and described with reference to process flows, apparatus diagrams, system diagrams, and flowcharts that relate to timing synchronization for non-terrestrial network communications.

FIG. 1 illustrates an example of a wireless communications system 100 that supports timing synchronization for non-terrestrial network communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support timing synchronization for non-terrestrial network communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity communications manager 101 may manage communications between a network entity 105 and other devices in the wireless communications system 100. In a similar manner, a UE communications manager 102 may manage communications between a UE 115 and other devices in the wireless communications system 100. As described herein, a network entity 105 may refer to a terrestrial communication device (such as a base station 140) or a non-terrestrial communication device (such as a satellite 185, a balloon, a drone, a UAS platform, or another non-terrestrial device). A non-terrestrial network entity 105 may be connected to a terrestrial network entity 105 via a gateway 190. In some examples, a non-terrestrial network entity 105 may correspond to a first cell type (e.g., a non-terrestrial network cell type), and a terrestrial network entity 105 may correspond to a second cell type (e.g., a terrestrial network cell type) different from the first cell type.

A non-terrestrial network may refer to a network, or one or more segments of networks using RF resources for communications between a UE 115 and a satellite 185 or a UAS platform. For instance, a UE may communicate with a non-terrestrial network entity 105 (e.g., a satellite 185 or another non-terrestrial device) via a service link, and the non-terrestrial network entity 105 may be connected to a gateway 190 (e.g., an non-terrestrial network gateway) via a feeder link. The gateways may be co-located with or in communication with another network entity 105 (e.g., a terrestrial network entity 105 such as a base station 140) and signaling may be communicated between the network entity 105 and the UE 115 via the gateway 190 and the non-terrestrial network entity 105. An non-terrestrial network cell may be associated with respective non-terrestrial network entities 105, and each non-terrestrial network entity 105 may be associated with one or more gateways 190.

In some examples, a non-terrestrial network entity 105 may be synchronized with respect to a synchronization reference point (e.g., an uplink time synchronization reference point (ULTSRP)). The synchronization reference point may represent a point (e.g., a logical point) at which downlink messages and uplink messages may be aligned (e.g., frame aligned) with an offset associated with a timing advance (TA). In some cases, a round trip time (RTT) between the UE 115 and the synchronization reference point may correspond to the sum of a service link RTT between the UE 115 and a serving non-terrestrial network entity 105 and a common TA between the serving non-terrestrial network entity 105 and the gateway. Additionally, an RTT between the synchronization reference point and a terrestrial network entity 105 (e.g., a base station 140 such as a gNB) may correspond to a timing parameter (e.g., K_mac).

A non-terrestrial network entity 105 may perform a handover procedure to transfer a UE 115 from a serving non-terrestrial network cell of the non-terrestrial network entity 105 to a target non-terrestrial network cell (e.g., a neighbor non-terrestrial network cell) of another non-terrestrial network entity 105. The non-terrestrial network entity 105 may transmit a message (e.g., a handover command) to the UE 115 indicating parameters such as ephemeris, epoch time (e.g., subframe number and SFN), common TA parameters, or other parameters associated with the target cell, which may be based on a timing of the target cell. The UE 115 use the received parameters to perform measurements in a configuration window (e.g., a synchronization signal block (SSB)-based radio resource management (RRM) timing configuration (SMTC) window) and may monitor an information block (e.g., an SSB, a master information block (MIB)) associated with the target cell. However, the UE 115 may not have information regarding a timing offset of the target cell with respect to the serving cell timing until the UE 115 first decodes the information block. Moreover, the UE 115 may perform blind decoding to detect the information block, which may increase power consumption at the UE 115. As such, the UE 115 may benefit from additional timing information being provided to assist in the handover procedure and enabling communications with the target NON-TERRESTRIAL NETWORK cell.

Accordingly, techniques, systems, and devices described herein provide for a UE 115 to receive additional information during a handover procedure. For example, a serving non-terrestrial network entity 105 and a target non-terrestrial network entity 105 may be synchronized with respect to a synchronization reference point, and the serving non-terrestrial network entity 105 or the target non-terrestrial network entity 105 may transmit a message indicating synchronization information to the UE 115. Additionally, or alternatively, the serving non-terrestrial network entity 105 or the target non-terrestrial network entity 105 may transmit a message indicating a timing offset of an arrival time for an SSB associated with the target non-terrestrial network entity 105 and an ephemeris, epoch time, or a reference time point. As such, the UE 115 may detect an SSB during a handover procedure with higher reliability, which may improve power saving, connectivity, and communication resource efficiency.

Figure 2:
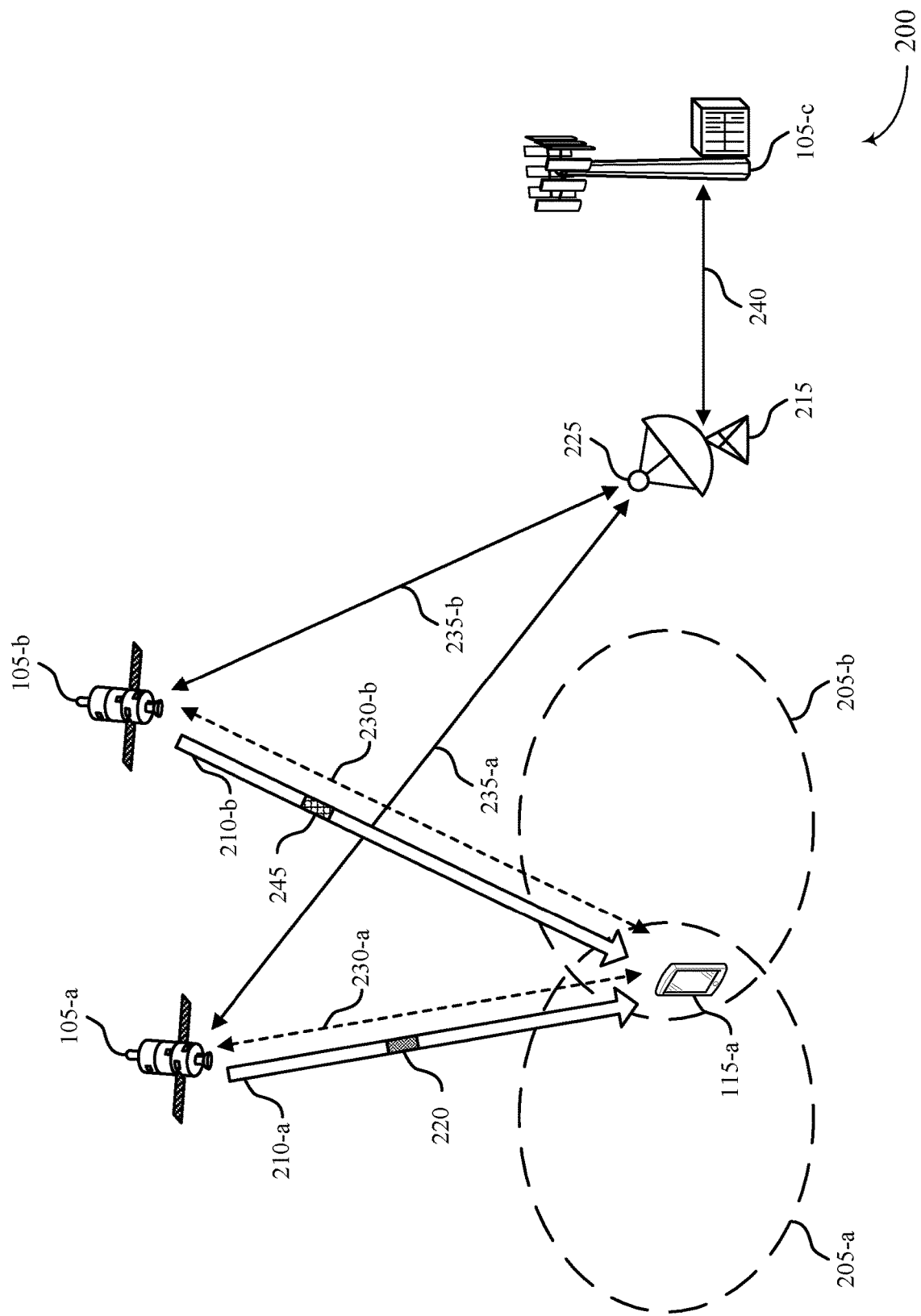
FIG. 2 illustrates an example of a wireless communications system that supports timing synchronization for non-terrestrial network communications in accordance with one or more aspects of the present disclosure.

FIG. 2 illustrates an example of a wireless communications system 200 that supports timing synchronization for non-terrestrial network communications in accordance with one or more aspects of the present disclosure. The wireless communications system 200 may be an example of a wireless communications system 100 as described herein with reference to FIG. 1. The wireless communications system 200 may include a UE 115-a, which may be an example of a UE 115 as described with reference to FIG. 1, and a network entity 105-a, a network entity 105-b, and a network entity 105-c, which may be examples of network entities 105 as described with reference to FIG. 1. In some cases, the network entity 105-a and the network entity 105-b may be examples of non-terrestrial network entities 105 (e.g., non-terrestrial network cells), as described herein, and may be connected to a gateway 215, which may be an example of a gateway 190 as described herein with reference to FIG. 1. Similarly, the network entity 105-*c* may be an example of terrestrial network entities 105 (e.g., a base station 140) as described herein with reference to FIG. 1.

The network entity 105-*a* and the network entity 105-*b* may be associated with coverage areas 205-*a* and 205-*b*, respectively, which may be examples of coverage areas 110, as described with reference to FIG. 1. The network entity 105-*a* and the network entity 105-*b* may communicate with UE 115-*a* via communication link 210-*a* and communication link 210-*b* (e.g., service links), respectively, which may be examples of communication links 125 as described herein, with reference to FIG. 1. In some examples, the network entity 105-*a* and the network entity 105-*b* may be or be associated with a satellite or a platform that provides the communication link 210-*a* and communication link 210-*b* (e.g., the service links), respectively.

The network entity 105-*a* and the network entity 105-*b* may each be synchronized with respect to a reference point 225 (e.g., an ULTSRP). The reference point 225 may represent a point at which downlink messages and uplink messages may be frame aligned with an offset associated with a TA. The reference point 225 may be located, for example, at the gateway 215 (as illustrated), at a platform, at one of the network entities 105, or at a point between a network entity 105 and the gateway. The network entity 105-*a* and the network entity 105-*b* may have a same reference point 225 or may each have a different reference point 225.

In some examples, an RTT between the UE 115-*a* and the reference point 225 for communications between the UE 115-*a* and the network entity 105-*c* via the network entity 105-*a* may correspond to the sum of a service link RTT 230-*a* between the UE 115 and the network entity 105-*a* and a common TA 235-*a* between network entity 105-*a* and the gateway 215. Similarly, an RTT between the UE 115-*a* and the reference point 225 for communications between the UE 115-*a* and the network entity 105-*c* via the network entity 105-*b* may correspond to the sum of a service link RTT 230-*b* between the UE 115 and the network entity 105-*b* and a common TA 235-*b* between network entity 105-*b* and the gateway 215. Further, an RTT between the reference point 225 and a terrestrial network entity 105-*c* may correspond to a timing delay 240 (e.g., K_mac). K_mac may represent a scheduling offset when downlink and uplink frame timing are not aligned at a network entity 105-*c* (e.g., at a gNB).

A network entity 105-*c*, which may be a serving network entity 105 of the UE 115-*a*, may perform a handover procedure to hand over the UE 115-*a* from a serving cell (e.g., associated with the network entity 105-*a*) to a target cell (e.g., a neighbor cell) (e.g., associated with the network entity 105-*b*). In some examples, the target cell may be associated with a same gateway, a same terrestrial network entity (e.g., gNB), or both, as the serving cell. In some other examples, the target cell may be associated with a different gateway, a different terrestrial network entity (e.g., gNB), or both, than the serving cell. In any case, the network entity 105-*c* may transmit a message (e.g., a handover command or message) to the UE 115-*a* indicating timing parameters (e.g., in an NTN-Config-r17 information element) such as ephemeris, epoch time (e.g., subframe number and SFN), common TA parameters, K_mac, and/or other parameters associated with the target cell of the network entity 105-*b*. The UE 115-*a* may be configured to perform measurements in a configuration window (e.g., an SMTC window) and may monitor an information block 245 (e.g., an SSB, an MIB) associated with the network entity 105-*b*. The UE 115-*a*, however, may not be aware of timing associated with the target cell (e.g., a precise timing offset of the target cell) associated with network entity 105-*b* with respect to the serving cell timing associated with the network entity 105-*a* based on the timing parameters alone, for example, until the UE 115 first reads the information block 245.

To assist the UE 115-*a* in receiving the information block 245, the network entity 105-*c* may transmit a message to the UE 115-*a* indicating synchronization information 220. In some examples, the network entity 105-*a* and the network entity 105-*b* may share the same gateway 215 and may have a same reference point 225 (e.g., an ULSRP). The network entity 105-*c* may transmit a message (e.g., an RRC message) indicating synchronization information 220. Additionally, or alternatively, the network entity 105-*c* may transmit a message (e.g., a handover message) indicating synchronization information 220. The synchronization information 220 may indicate to the UE 115-*a* that the network entity 105-*a* and the network entity 105-*b* have the same reference point 225. Accordingly, the UE 115-*a* may determine timing information corresponding to the information block 245 based on the received timing parameters and the synchronization information 220, and the UE 115-*a* may detect (e.g., receive) the information block 245.

In some cases, the synchronization information 220 may be indicated to the UE 115-*a* via an indication field of an information element (e.g., SSB-ConfigMobility indicated by a measurement object configuration (e.g., MeasObjectNR)) or other message. For example, the synchronization information 220 may be signaled using a field (e.g., deriveSSB-IndexFromCell) that, if set to true, may be used by the UE 115-*a* to assume an SNF and frame boundary alignment across cells on a same frequency carrier (e.g., the UE 115-*a* may be configured to utilize timings of the serving cell to derive indexes of SSBs transmitted by the target cell or other neighbor cells). For a non-terrestrial network cell, the field may indicate whether the UE 115-*a* may use a reference point 225 (e.g., an ULTSRP) of one or more detected cells on a target frequency to derive an SSB index of one or more neighbor cells on the target frequency.

In another example, the synchronization information 220 may be indicated via a field (e.g., deriveSSB-IndexFrom-CellInter), which may be used to configure the UE to assume an SFN and frame boundary alignment between a reference serving cell indicated by an index (e.g., ServCellIndex) and one or more neighbor cells (e.g., cells in a MeasObjectNR). For a non-terrestrial network cell, the UE 115-*a* may be further configured to assume the reference point alignment (e.g., the ULTSRP alignment) between a reference serving cell (e.g., indicated by ServCellIndex) and one or more neighboring cells (e.g., indicated by MeasObjectNR).

In some examples, the reference point 225 of the network entity 105-*a* may be different from the reference point 225 of the network entity 105-*b*. For instance, the network entity 105-*a* and the network entity 105-*b* may be associated with different gateways. In such examples, the synchronization information 220 may indicate to the UE 115-*a* a timing offset (e.g., a timing offset value) between the reference point 225 associated with the serving non-terrestrial network cell and the reference point 225 associated with the target non-terrestrial network cell. In some examples, the timing offset may be indicated to the UE 115-*a* in a handover message including one or more other timing parameters. Additionally, or alternatively, the UE 115-*a* may receive a measurement object configuration from the network entity 105-*a* (e.g., the serving network entity 105-*a*), and the measurement object configuration may include the timing offset for a list of one or more cells, including the target cell of the network entity 105-*b*. In further examples, the UE 115-*a* may receive a broadcast that indicates a list of inter-frequency cells, intra-frequency cells, neighbor non-terrestrial network entities 105, or a combination thereof, and the broadcast may indicate a timing offset of the respective cells, including the target non-terrestrial network cell. In some examples, if the UE 115-*a* does not receive a timing offset, the UE 115-*a* may determine (e.g., assume) that the reference points 225 associated with the serving cell and the target cell are the same (e.g., are synchronized).

In some aspects, the network entity 105-*c* may transmit a message to UE 115-*a* indicating a time difference (e.g., a downlink time difference) at a particular reference point (e.g., at a reference point corresponding to network entity 105-*a* and/or network entity 105-*b*), which the UE 115-*a* may use to compute the timing of the target non-terrestrial network cell (e.g., associated with the network entity 105-*b*). Additionally, or alternatively, the network entity 105-*c* may transmit a message (e.g., via communication link 210-*a*) indicating a timing offset associated with receiving the information block 245. The network entity 105-*c* may be aware of an arrival time of the information block at the network entity 105-*b*. Accordingly, the network entity 105-*c* may provide a timing offset associated with the difference between the information block 245 arrival time at the target cell and the ephemeris of the serving cell, the epoch time of the serving cell, or a reference time point. The UE 115-*a* may calculate an arrival time of the information block 245 based on the timing offset received from the network entity 105-*a* and, in some examples, by calculating the service link RTT 230-*b* between the UE 115-*a* and the network entity 105-*b*.

The network entity 105-*c* may transmit a message (e.g., via communication link 210-*a*) to the UE 115-*a* indicating a time when the information block 245 is transmitted by a terrestrial network entity 105 associated with the network entity 105-*b*. For example, the network entity 105-*c* may transmit an indication of an SFN and a subframe (e.g., a slot number) associated with the transmission of the information block 245. The UE 115-*a* may determine an arrival time of the information block 245 based on the indication and based on the service link RTT 230-*b*, the common TA 235-*b*, the timing delay 240 (e.g., K_mac), SMTC configuration, or any combination thereof.

In some examples, the network entity 105-*c* may transmit a message to the UE 115-*a* indicating timing information associated with the reception of a handover command by the network entity 105-*c* from a different network entity that is associated with the target non-terrestrial network cell (e.g., in the case where the network entity 105-*b* is associated with a network entity different from network entity 105-*c*). For example, the message may indicate a reception time of the handover command by the network entity 105-*c*. In some cases, the message may be multiplexed in a MAC service data unit (SDU) carrying handover commands (e.g., to the UE 115-*a*). Alternatively, the message may be transmitted separately using a MAC control element (MAC-CE), an RRC message, or the like. In some aspects, such as in conditional handover cases, an RRC message carrying a conditional handover command may be extended to include the message indicating the timing information. In some aspects, the timing information may be used to determine a validity time of parameters of the target cell or an epoch time of the target cell. In some aspects of time-based conditional handover, the time information for the epoch time or parameter validity time is a frame associated with a time when the time-based conditional handover becomes valid.

Accordingly, the UE 115-*a* may receive synchronization information 220 from the network entity 105-*a* or the network entity 105-*b*, which may be used to efficiently calculate timing information for a target non-terrestrial network cell, thereby improving the reliability of reception of the information block 245 and reducing blind decoding performed by the UE 115-*a*.

Figure 3:
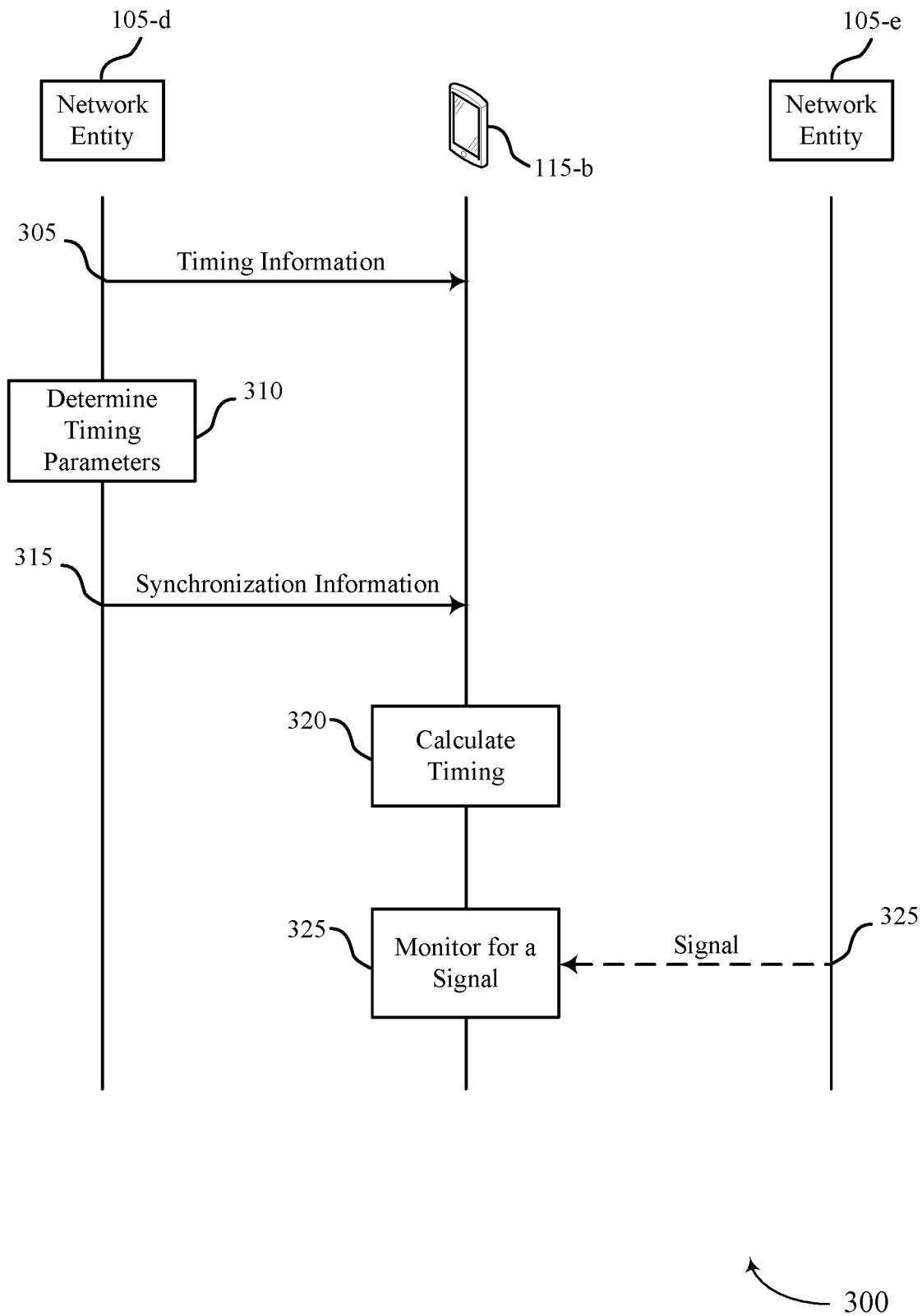
FIG. 3 illustrates an example of a process flow in a system that supports timing synchronization for non-terrestrial network communications in accordance with one or more aspects of the present disclosure.

FIG. 3 illustrates an example of a process flow 300 in a system that supports timing synchronization for non-terrestrial network communications in accordance with one or more aspects of the present disclosure. The process flow may illustrate communications between a UEs 115-*b* and network entities 105-*d* and 105-*e*, which may be examples of corresponding devices as described herein with reference to FIGS. 1 and 2. In some examples, the network entity 105-*d* may correspond to a serving network entity 105-*d* of the UE 115-*d*, and the network entity 105-*e* may correspond to a target network entity for a handover procedure. In some examples, the network entity 105-*d* and the network entity 105-*e* may be examples of non-terrestrial network entities 105 and may be associated with non-terrestrial network cells.

At 305, the network entity 105-*d* may transmit timing information to the UE 115-*b*. For example, the network entity 105-*d* may transmit a message indicating the UE 115-*b* of timing parameters (e.g., via an NTN-Config-r17 information element) such as ephemeris, epoch time (e.g., subframe number and SFN), common TA parameters, K_mac, or other parameters for the UE 115-*b* to access a network (e.g., NR network) via a non-terrestrial network.

At 310, the network entity 105-*d* may determine one or more timing parameters of the network entity 105-*e*, and may determine synchronization information (e.g., cell synchronization information) associated with the network entity 105-*d* and the network entity 105-*e*. For example, the network entity 105-*d* may determine that the network entity 105-*d* and the second network entity 105-*e* are synchronized at a reference point (e.g., an ULTSRP). Additionally, or alternatively, the network entity 105-*d* may generate a timing offset value corresponding to a difference between a synchronization reference point of the network entity 105-*d* and a synchronization reference point of the network entity 105-*e*. The timing offset may be or include an SFN, a subframe, a slot number, or a combination thereof. In some examples, the network entity 105-*d* may calculate a timing difference between downlink transmissions of the network entity 105-*d* and downlink transmissions of the network entity 105-*e*. The timing difference may be based on a reference point of the network entity 105-*d* and a reference point of the network entity 105-*e*, and the reference points may be or correspond to a satellite, a platform, a gateway, or a combination thereof, providing a service link to the network entity 105-*d* or the network entity 105-*e*. In some examples, the network entity 105-*d* may determine a timing offset between an SSB arrival time at a node of the network entity 105-*d* and an SSB arrival time at a node of the network entity 105-*e*, and the timing offset may be based on an epoch time of the network entity 105-*d*, a reference time, or both. Additionally, or alternatively, the network entity 105-*d* may determine a transmission time for a one or more SSBs transmitted by the network entity 105-*e*, and the transmission time may be or indicate an SFN and a subframe based on a timing of the network entity 105-*d*.

At 315, the UE 115-*b* may receive a message indicating synchronization information from the network entity 105-*d*

(e.g., in an RRC message, a handover message, or a system information message) as described herein, with reference to FIG. 2. For example, the network entity 105-*d* may transmit a message indicating the synchronization information determined by the network entity 105-*d* to the UE 115-*b*. In some examples, the synchronization information may include an indication that the network entity 105-*d* and the network entity 105-*e* are synchronized at a reference point (e.g., an ULTSRP). In other examples, the synchronization information may indicate the UE 115-*b* of a timing offset value between a synchronization reference point of the network entity 105-*d* and a synchronization reference point of the network entity 105-*e*. The timing offset value may be or include a SFN, a subframe, a slot number, or a combination thereof. In some cases, the synchronization information may be received in a measurement object configuration for a set of one or more non-terrestrial network entities 105, which may include the network entity 105-*e*.

In some examples, the UE 115-*a* may determine that the network entity 105-*d* and the network entity 105-*e* are synchronized at the reference point based on the synchronization information excluding an indication of the timing offset value. In some examples, the synchronization information may indicate a timing offset between a first SSB arrival time at a node of the network entity 105-*d* and a second SSB arrival time at a node of the network entity 105-*e*, and the timing offset may be based on an epoch time of the network entity 105-*d*, a reference time, or both. In some cases, the synchronization information may indicate to the UE 115-*b* of a transmission time for one or more SSBs transmitted by the network entity 105-*e*, and the transmission time may be or indicate an SFN and a subframe based on a timing of the network entity 105-*d*. In some cases, the message indicating synchronization information may indicate to the UE 115-*a* of a reception time of the handover command sent from the network entity 105-*e* to the network entity 105-*d*.

At 320, the UE 115-*a* may calculate a timing associated with signaling from the network entity 105 based on the timing information received from the network entity 105-*d* and the synchronization information (e.g., the cell synchronization information) received from the network entity 105-*d*.

At 325, the UE 115-*b* may monitor for one or more signals from the network entity 105-*e* based on the calculated timing. The network entity 105-*e* may transmit one or more signals to the UE 115-*b*. For example, the network entity 105-*e* may transmit one or more information blocks (e.g., SSBs), which may indicate cell or timing information to the UE 115-*b*. Based on the monitoring, the UE 115-*b* may receive the signals from the network entity 105-*e* using the calculated timing (e.g., at 320).

Figure 4:
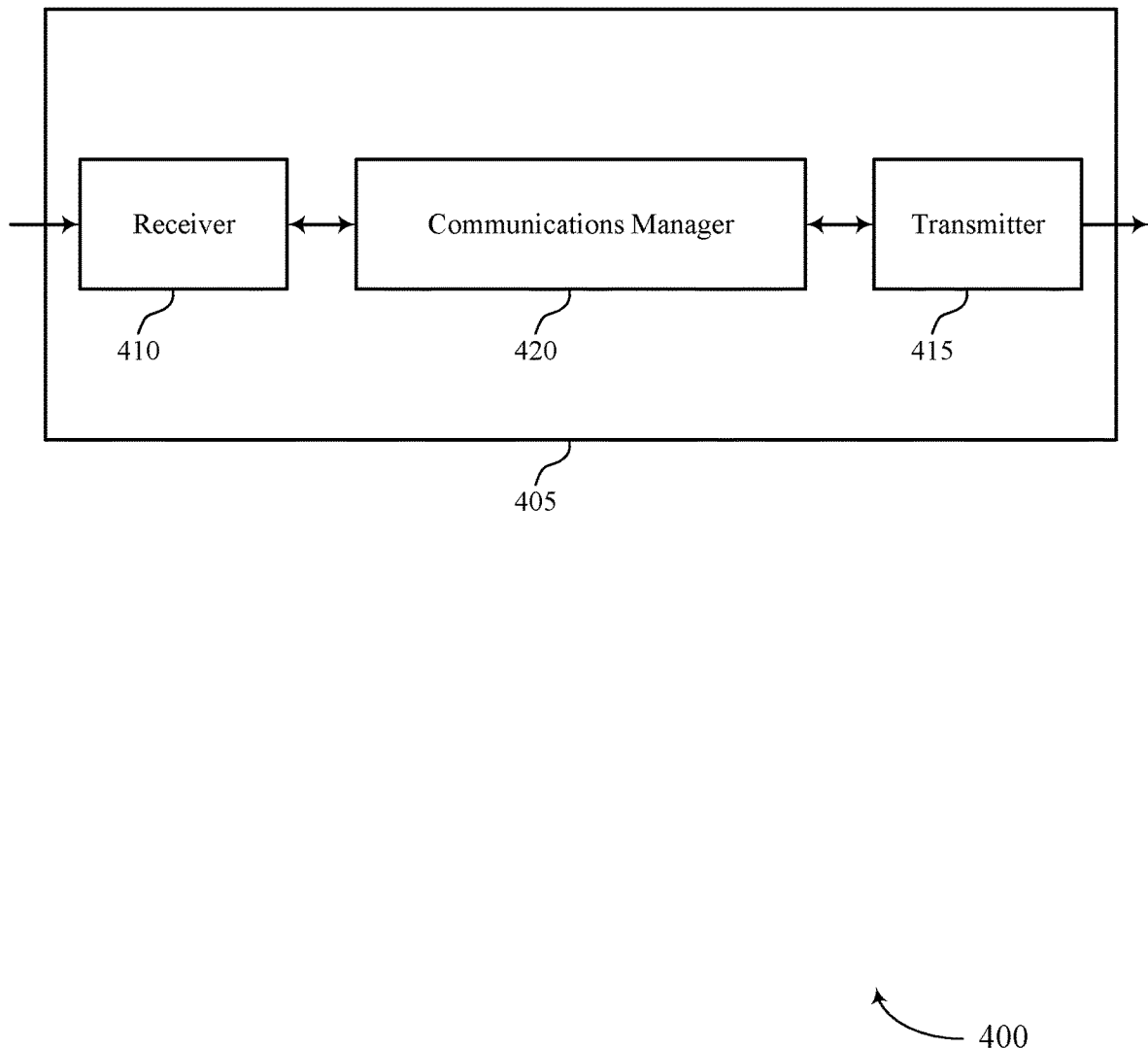
FIGS. 4 and 5 show block diagrams of devices that support timing synchronization for non-terrestrial network communications in accordance with one or more aspects of the present disclosure.

FIG. 4 shows a block diagram 400 of a device 405 that supports timing synchronization for non-terrestrial network communications in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to timing synchronization for non-terrestrial network communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to timing synchronization for non-terrestrial network communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of timing synchronization for non-terrestrial network communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in communication with a first non-terrestrial network cell in accordance with examples as disclosed herein. For example, the communications manager 420 may be configured as or otherwise support a means for receiving a message indicating cell synchronization information for a second non-terrestrial network cell, the cell synchronization information indicating whether the first non-terrestrial network cell and the second non-terrestrial network cell are synchronized at a reference point. The communications manager 420 may be configured as or otherwise support a means for calculating a timing associated with signaling from the second non-terrestrial network cell based on the cell synchronization information. The communications manager 420 may be configured as or otherwise support a means for receiving one or more signals from the second non-terrestrial network cell based on the calculated timing.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for timing synchronization for non-terrestrial network communications using reduced power consumption and more efficient utilization of communication resources.

Figure 5:
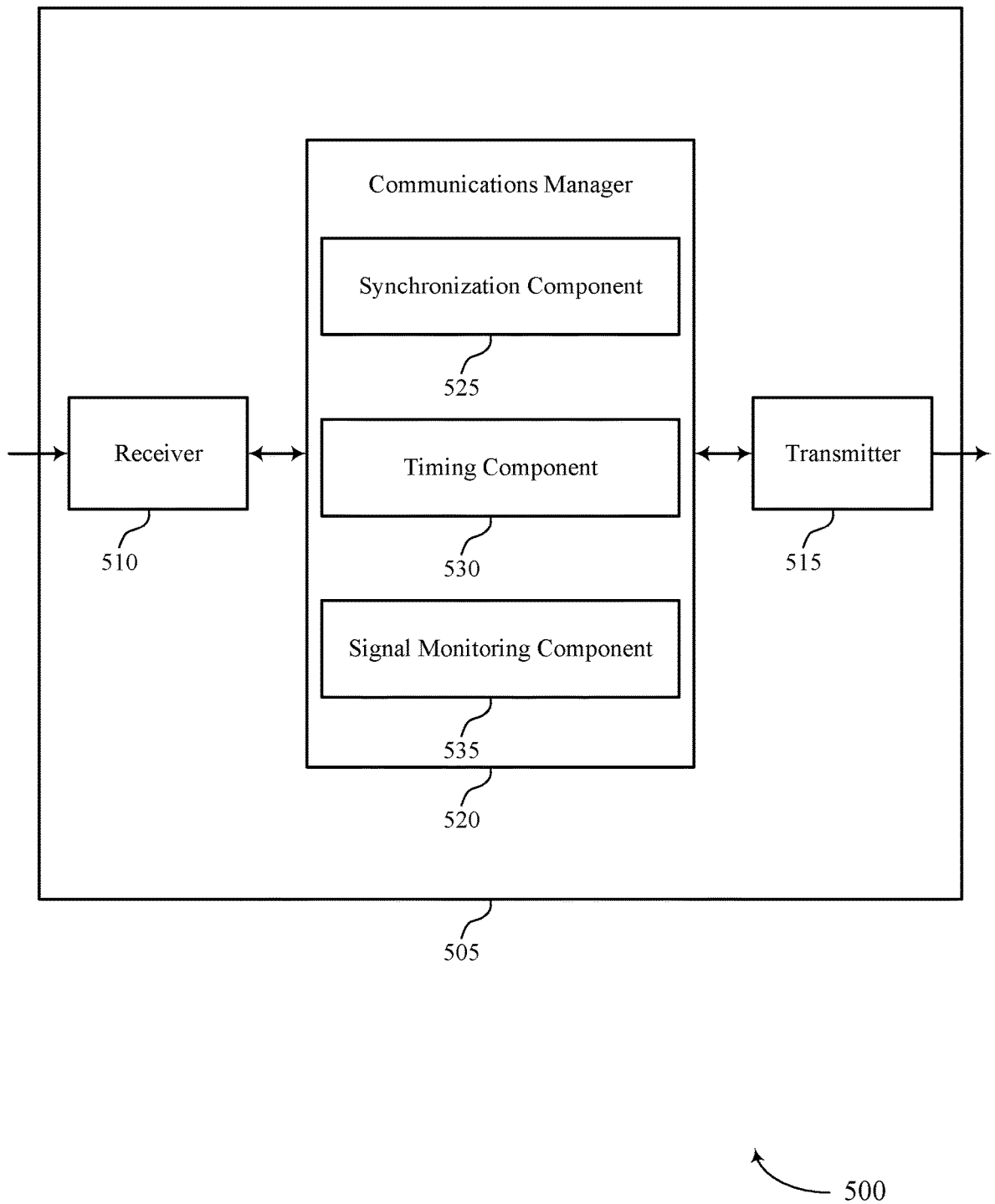

FIG. 5 shows a block diagram 500 of a device 505 that supports timing synchronization for non-terrestrial network communications in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to timing synchronization for non-terrestrial network communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to timing synchronization for non-terrestrial network communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of timing synchronization for non-terrestrial network communications as described herein. For example, the communications manager 520 may include a synchronization component 525, a timing component 530, a signal monitoring component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in communication with a first non-terrestrial network cell in accordance with examples as disclosed herein. The synchronization component 525 may be configured as or otherwise support a means for receiving a message indicating cell synchronization information for a second non-terrestrial network cell, the cell synchronization information indicating whether the first non-terrestrial network cell and the second non-terrestrial network cell are synchronized at a reference point. The timing component 530 may be configured as or otherwise support a means for calculating a timing associated with signaling from the second non-terrestrial network cell based on the cell synchronization information. The signal monitoring component 535 may be configured as or otherwise support a means for receiving one or more signals from the second non-terrestrial network cell based on the calculated timing.

Figure 6:
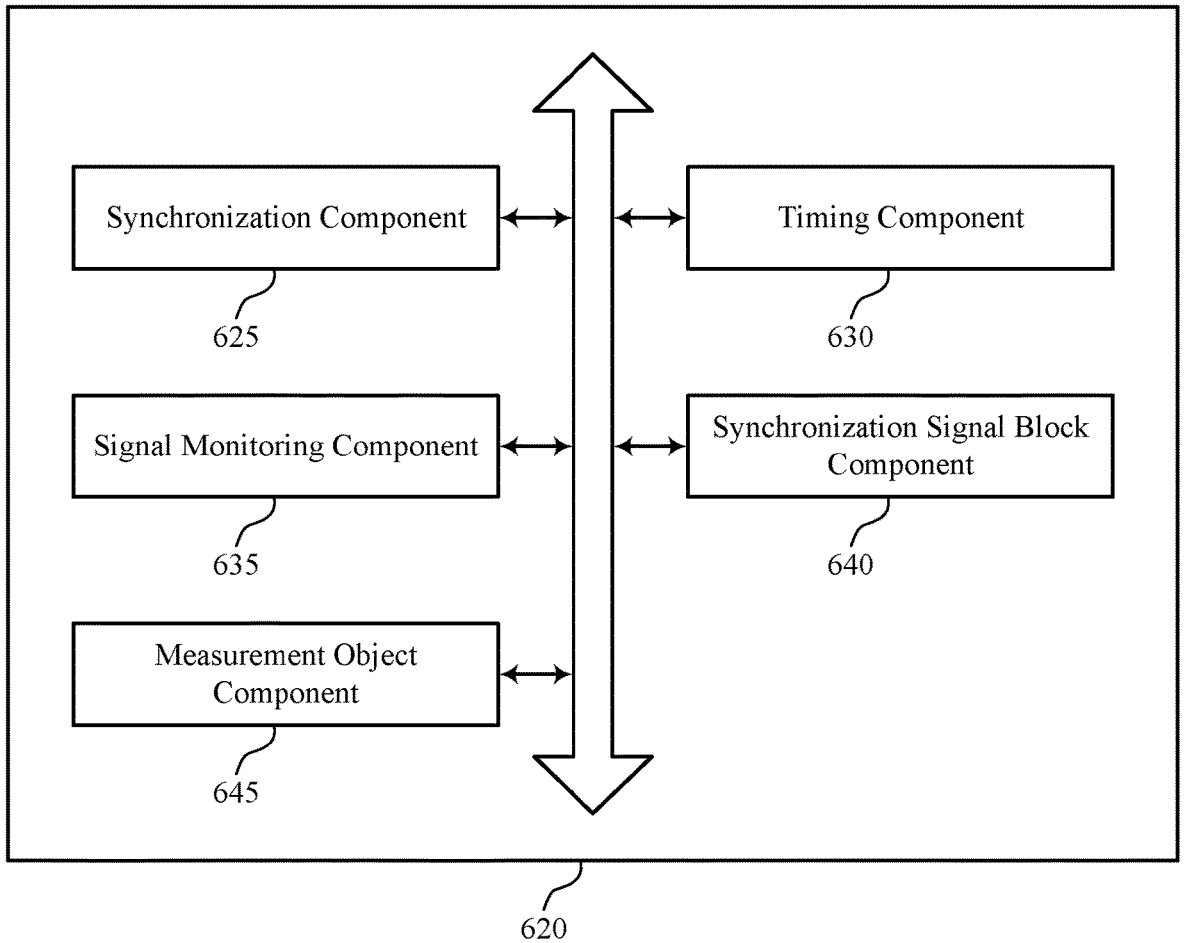
FIG. 6 shows a block diagram of a communications manager that supports timing synchronization for non-terrestrial network communications in accordance with one or more aspects of the present disclosure.

FIG. 6 shows a block diagram 600 of a communications manager 620 that supports timing synchronization for non-terrestrial network communications in accordance with one or more aspects of the present disclosure. The communications manager 620 may be an example of aspects of a communications manager 420, a communications manager 520, or both, as described herein. The communications manager 620, or various components thereof, may be an example of means for performing various aspects of timing synchronization for non-terrestrial network communications as described herein. For example, the communications manager 620 may include a synchronization component 625, a timing component 630, a signal monitoring component 635, a synchronization signal block component 640, a measurement object component 645, or any combination thereof. Each of these components may communicate, directly or indirectly, with one another (e.g., via one or more buses).

The communications manager 620 may support wireless communication at a UE in communication with a first non-terrestrial network cell in accordance with examples as disclosed herein. The synchronization component 625 may be configured as or otherwise support a means for receiving a message indicating cell synchronization information for a second non-terrestrial network cell, the cell synchronization information indicating whether the first non-terrestrial network cell and the second non-terrestrial network cell are synchronized at a reference point. The timing component 630 may be configured as or otherwise support a means for calculating a timing associated with signaling from the second non-terrestrial network cell based on the cell synchronization information. The signal monitoring component 635 may be configured as or otherwise support a means for receiving one or more signals from the second non-terrestrial network cell based on the calculated timing.

In some examples, to support calculating the timing, the timing component 630 may be configured as or otherwise support a means for calculating the timing based on a first uplink time synchronization reference point of the first non-terrestrial network cell being synchronized with a second uplink time synchronization reference point of the second non-terrestrial network cell, where the cell synchronization information indicates that the first uplink time synchronization reference point and the second uplink time synchronization reference point are synchronized.

In some examples, to support calculating the timing, the timing component 630 may be configured as or otherwise support a means for calculating the timing based on a timing offset value between a first uplink time synchronization reference point of the first non-terrestrial network cell and a second uplink time synchronization reference point of the second non-terrestrial network cell, where the cell synchronization information indicates the timing offset. In some examples, the timing offset value includes a system frame number, a subframe, a slot number, or any combination thereof.

In some examples, to support receiving the message, the measurement object component 645 may be configured as or otherwise support a means for receiving the message from the first non-terrestrial network cell, the message including a measurement object configuration for a set of one or more non-terrestrial network cells including the second non-terrestrial network cell.

In some examples, the synchronization component 625 may be configured as or otherwise support a means for determining that a first uplink time synchronization reference point of the first non-terrestrial network cell is synchronized with a second uplink time synchronization reference point of the second non-terrestrial network cell based on the message excluding an indication of a timing offset value.

In some examples, the message includes a radio resource control message from the first non-terrestrial network cell. In some examples, the message includes a handover message from the second non-terrestrial network cell, and the message may indicate a reception time associated with a time when the first non-terrestrial network cell received a handover command from the second non-terrestrial network cell prior to the first non-terrestrial network cell transmitting the message to the UE. In some examples, the message includes a system information message from the first non-terrestrial network cell or the second non-terrestrial network cell.

In some examples, to support calculating the timing, the timing component 630 may be configured as or otherwise support a means for calculating the timing based on a timing difference between downlink transmissions of the first non-terrestrial network cell and downlink transmissions of the second non-terrestrial network cell, the timing difference being based on a first reference point of the first non-terrestrial network cell and a second reference point of the second non-terrestrial network cell, where the cell synchronization information indicates the timing difference.

In some examples, the first reference point includes a first satellite, or a first platform, or both, providing a first service link for the first non-terrestrial network cell. In some examples, the second reference point includes a second satellite, or a second platform, or both, providing a second service link for the second non-terrestrial network cell, the second service link being different from the first service link.

In some examples, to support calculating the timing, the synchronization signal block component 640 may be configured as or otherwise support a means for calculating the timing based on a timing offset between a first synchronization signal block arrival time at a first network node of the first non-terrestrial network cell and a second synchronization signal block arrival time at a second network node of the second non-terrestrial network cell, where the cell synchronization information indicates the timing offset.

In some examples, the timing offset is based on an epoch time of the first network node, a reference time, or both. In some examples, the first network node includes a first satellite or a first platform providing a first service link for the first non-terrestrial network cell. In some examples, the second network node includes a second satellite or a second platform providing a second service link for the second non-terrestrial network cell, the second service link being different from the first service link.

In some examples, to support calculating the timing, the synchronization signal block component 640 may be configured as or otherwise support a means for calculating the timing based on a transmission time for synchronization signal blocks transmitted by a network node associated with the second non-terrestrial network cell, where the cell synchronization information indicates the transmission time. In some examples, the transmission time indicates an SFN and a subframe based on a timing of the first non-terrestrial network cell.

Figure 7:
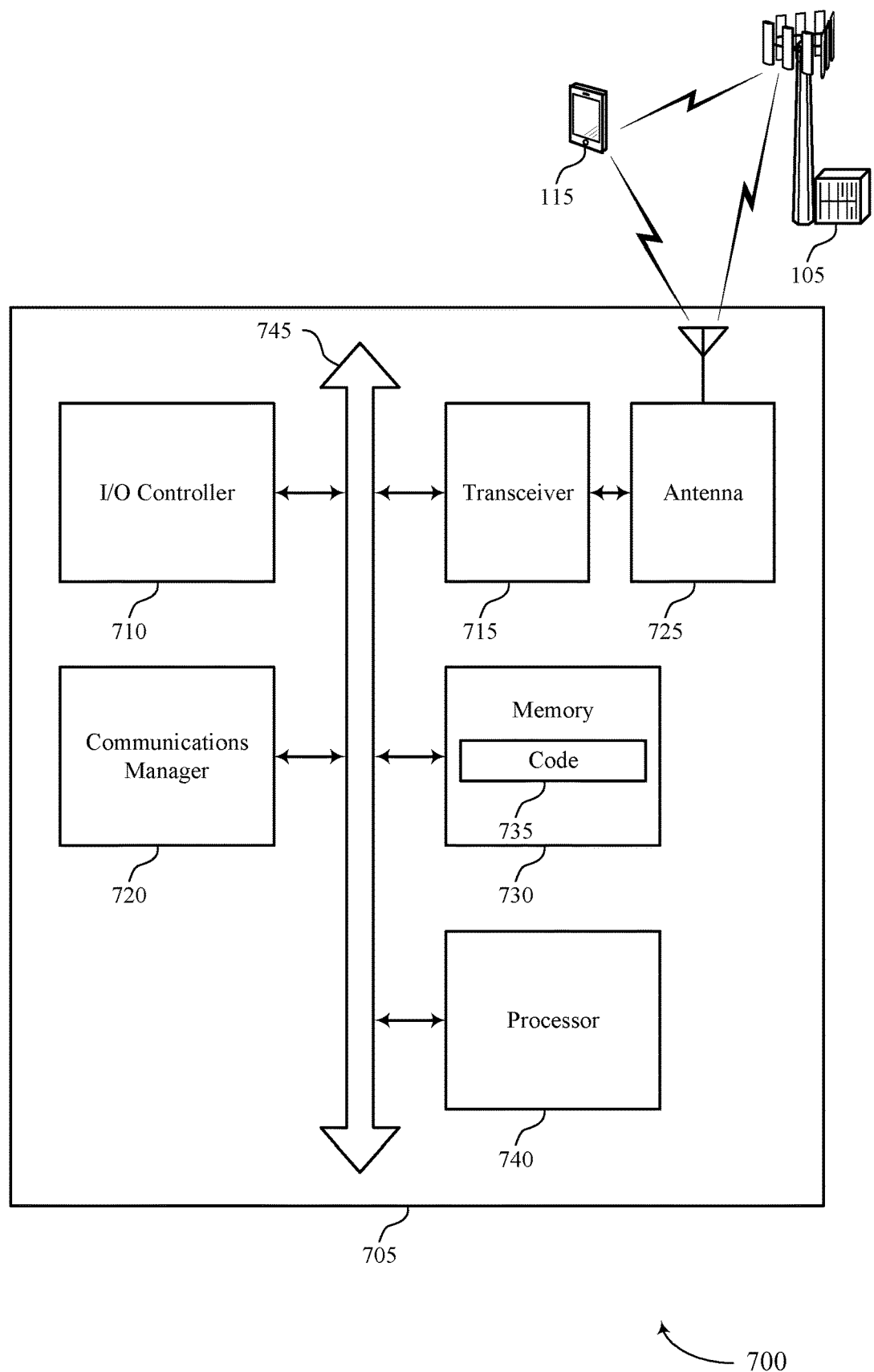
FIG. 7 shows a diagram of a system including a device that supports timing synchronization for non-terrestrial network communications in accordance with one or more aspects of the present disclosure.

FIG. 7 shows a diagram of a system 700 including a device 705 that supports timing synchronization for non-terrestrial network communications in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting timing synchronization for non-terrestrial network communications). For example, the device 705 or a component of the device 705 may include a processor 740 and memory 730 coupled with or to the processor 740, the processor 740 and memory 730 configured to perform various functions described herein.

The communications manager 720 may support wireless communication at a UE in communication with a first non-terrestrial network cell in accordance with examples as disclosed herein. For example, the communications manager 720 may be configured as or otherwise support a means for receiving a message indicating cell synchronization information for a second non-terrestrial network cell, the cell synchronization information indicating whether the first non-terrestrial network cell and the second non-terrestrial network cell are synchronized at a reference point. The communications manager 720 may be configured as or otherwise support a means for calculating a timing associated with signaling from the second non-terrestrial network cell based on the cell synchronization information. The communications manager 720 may be configured as or otherwise support a means for receiving one or more signals from the second non-terrestrial network cell based on the calculated timing.

By including or configuring the communications manager 720 in accordance with examples as described herein, the device 705 may support techniques for timing synchronization for non-terrestrial networks with improved communication reliability, improved coordination between devices, and reduced power consumption.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of timing synchronization for non-terrestrial network communications as described herein, or the processor 740 and the memory 730 may be otherwise configured to perform or support such operations.

Figure 8:
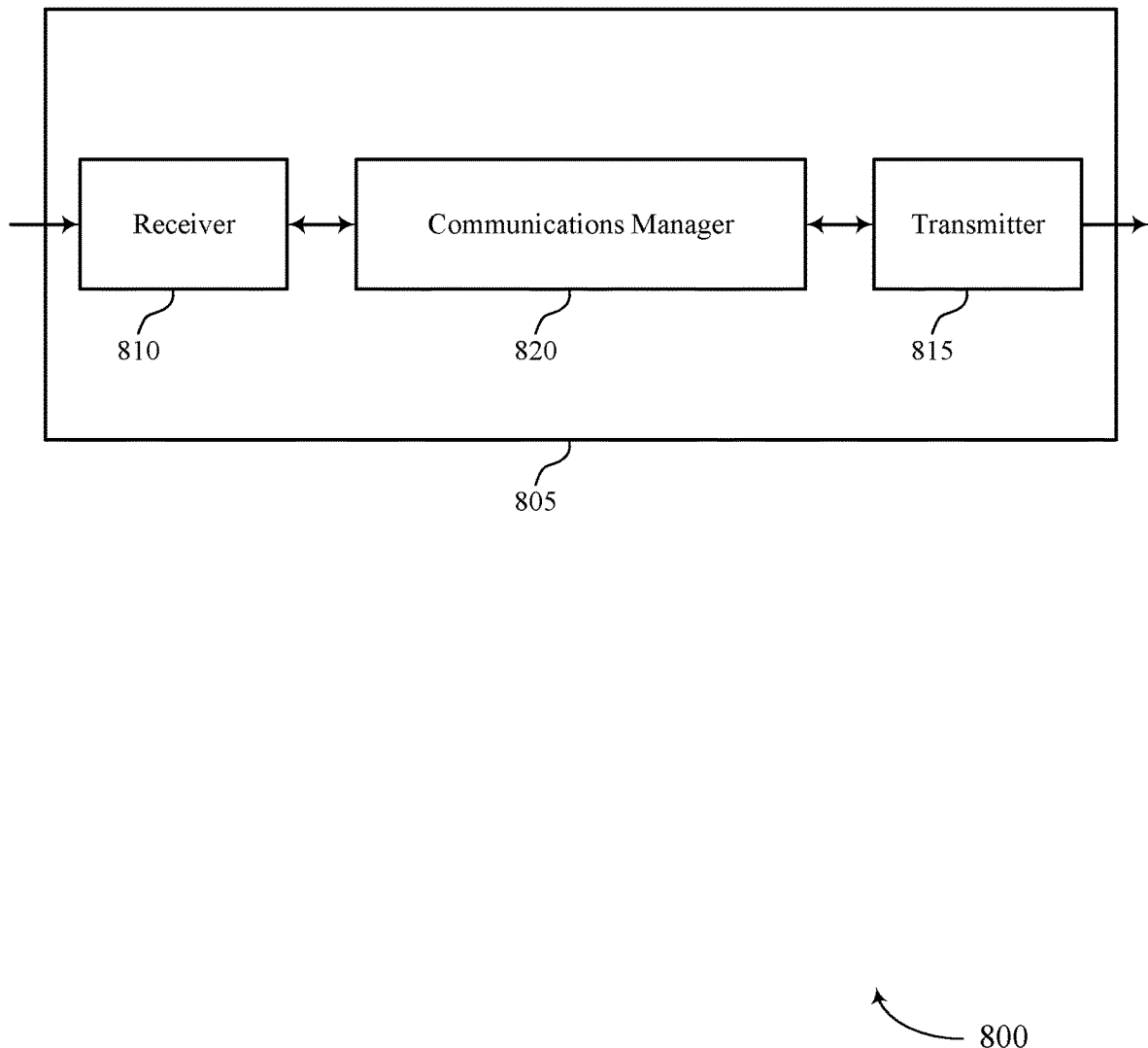
FIGS. 8 and 9 show block diagrams of devices that support timing synchronization for non-terrestrial network communications in accordance with one or more aspects of the present disclosure.

FIG. 8 shows a block diagram 800 of a device 805 that supports timing synchronization for non-terrestrial network communications in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of timing synchronization for non-terrestrial network communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network node associated with a first non-terrestrial network cell in accordance with examples as disclosed herein. For example, the communications manager 820 may be configured as or otherwise support a means for determining one or more timing parameters of a second non-terrestrial network cell different from the first non-terrestrial network cell. The communications manager 820 may be configured as or otherwise support a means for transmitting a message indicating cell synchronization information for the second non-terrestrial network cell, the cell synchronization information indicating whether the first non-terrestrial network cell and the second non-terrestrial network cell are synchronized at a reference point based on the one or more timing parameters.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for timing synchronization for non-terrestrial networks with reduced power consumption and more efficient utilization of communication resources.

Figure 9:
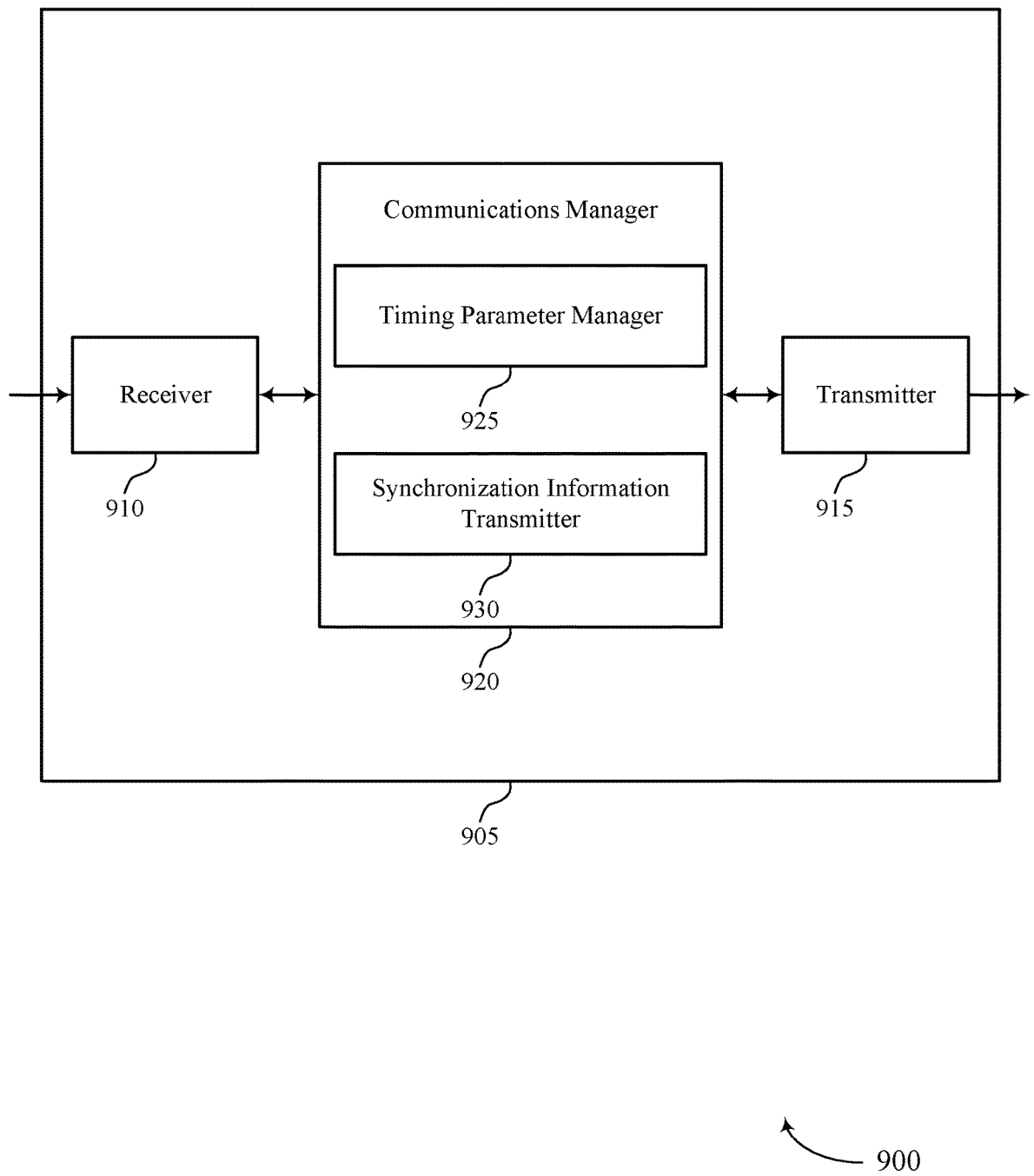

FIG. 9 shows a block diagram 900 of a device 905 that supports timing synchronization for non-terrestrial network communications in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of timing synchronization for non-terrestrial network communications as described herein. For example, the communications manager 920 may include a timing parameter manager 925 a synchronization information transmitter 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network node associated with a first non-terrestrial network cell in accordance with examples as disclosed herein. The timing parameter manager 925 may be configured as or otherwise support a means for determining one or more timing parameters of a second non-terrestrial network cell different from the first non-terrestrial network cell. The synchronization information transmitter 930 may be configured as or otherwise support a means for transmitting a message indicating cell synchronization information for the second non-terrestrial network cell, the cell synchronization information indicating whether the first non-terrestrial network cell and the second non-terrestrial network cell are synchronized at a reference point based on the one or more timing parameters.

Figure 10:
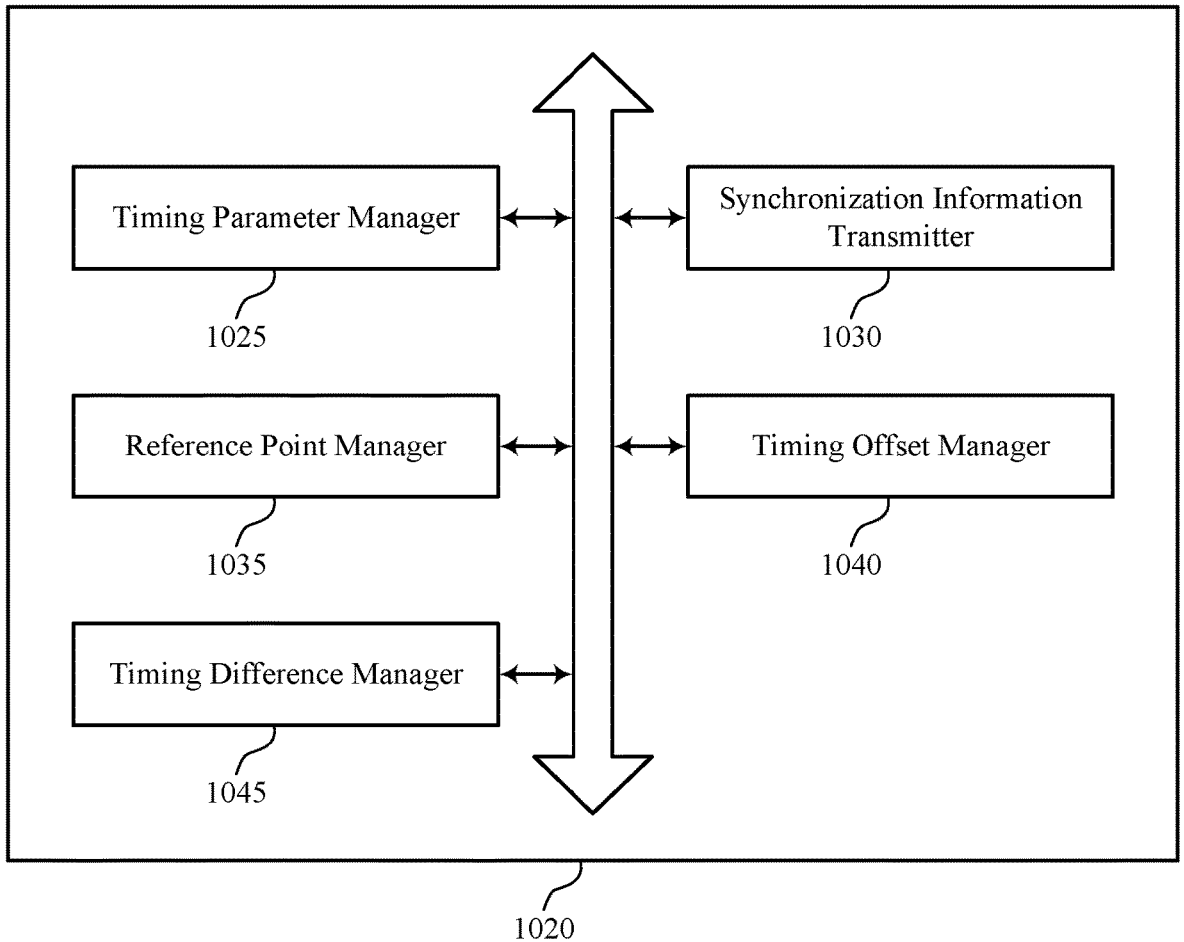
FIG. 10 shows a block diagram of a communications manager that supports timing synchronization for non-terrestrial network communications in accordance with one or more aspects of the present disclosure.

FIG. 10 shows a block diagram 1000 of a communications manager 1020 that supports timing synchronization for non-terrestrial network communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of timing synchronization for non-terrestrial network communications as described herein. For example, the communications manager 1020 may include a timing parameter manager 1025, a synchronization information transmitter 1030, a reference point manager 1035, a timing offset manager 1040, a timing difference manager 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network node associated with a first non-terrestrial network cell in accordance with examples as disclosed herein. The timing parameter manager 1025 may be configured as or otherwise support a means for determining one or more timing parameters of a second non-terrestrial network cell different from the first non-terrestrial network cell. The synchronization information transmitter 1030 may be configured as or otherwise support a means for transmitting a message indicating cell synchronization information for the second non-terrestrial network cell, the cell synchronization information indicating whether the first non-terrestrial network cell and the second non-terrestrial network cell are synchronized at a reference point based on the one or more timing parameters. In some examples, the message includes a measurement object configuration for a set of one or more non-terrestrial network cells including the second non-terrestrial network cell.

In some examples, to support determining the one or more timing parameters, the reference point manager 1035 may be configured as or otherwise support a means for determining that a first uplink time synchronization reference point of the first non-terrestrial network cell is synchronized with a second uplink time synchronization reference point of the second non-terrestrial network cell, where the cell synchronization information indicates that the first uplink time synchronization reference point and the second uplink time synchronization reference point are synchronized.

In some examples, to support determining the one or more timing parameters, the timing offset manager 1040 may be configured as or otherwise support a means for generating a timing offset value corresponding to a difference between a first uplink time synchronization reference point of the first non-terrestrial network cell and a second uplink time synchronization reference point of the second non-terrestrial network cell, where the cell synchronization information indicates the timing offset value. In some examples, the timing offset value includes a system frame number, a subframe, a slot number, or any combination thereof.

In some examples, to support determining the one or more timing parameters, the timing difference manager 1045 may be configured as or otherwise support a means for calculating a timing difference between downlink transmissions of the first non-terrestrial network cell and downlink transmissions of the second non-terrestrial network cell, the timing difference being based on a first reference point of the first non-terrestrial network cell and a second reference point of the second non-terrestrial network cell, where the cell synchronization information indicates the timing difference.

In some examples, the first reference point includes a first satellite, or a first platform, or both, providing a first service link for the first non-terrestrial network cell. In some examples, the second reference point includes a second satellite, or a second platform, or both, providing a second service link for the second non-terrestrial network cell, the second service link being different from the first service link.

In some examples, to support determining the one or more timing parameters, the timing offset manager 1040 may be configured as or otherwise support a means for determining a timing offset between a first synchronization signal block arrival time at a first network node of the first non-terrestrial network cell and a second synchronization signal block arrival time at a second network node of the second non-terrestrial network cell, where the cell synchronization information indicates the timing offset. In some examples, the timing offset is based on an epoch time of the first network node, a reference time, or both.

In some examples, the first network node includes a first satellite or a first platform providing a first service link for the first non-terrestrial network cell. In some examples, the second network node includes a second satellite or a second platform providing a second service link for the second non-terrestrial network cell, the second service link being different from the first service link.

In some examples, to support determining the one or more timing parameters, the timing parameter manager 1025 may be configured as or otherwise support a means for determining a transmission time for synchronization signal blocks transmitted by a second network node associated with the second non-terrestrial network cell, where the cell synchronization information indicates the transmission time, the transmission time indicating an SFN and a subframe based on a timing of the first non-terrestrial network cell. In some examples, the message includes a radio resource control message, a handover message, a system information, or any combination thereof.

Figure 11:
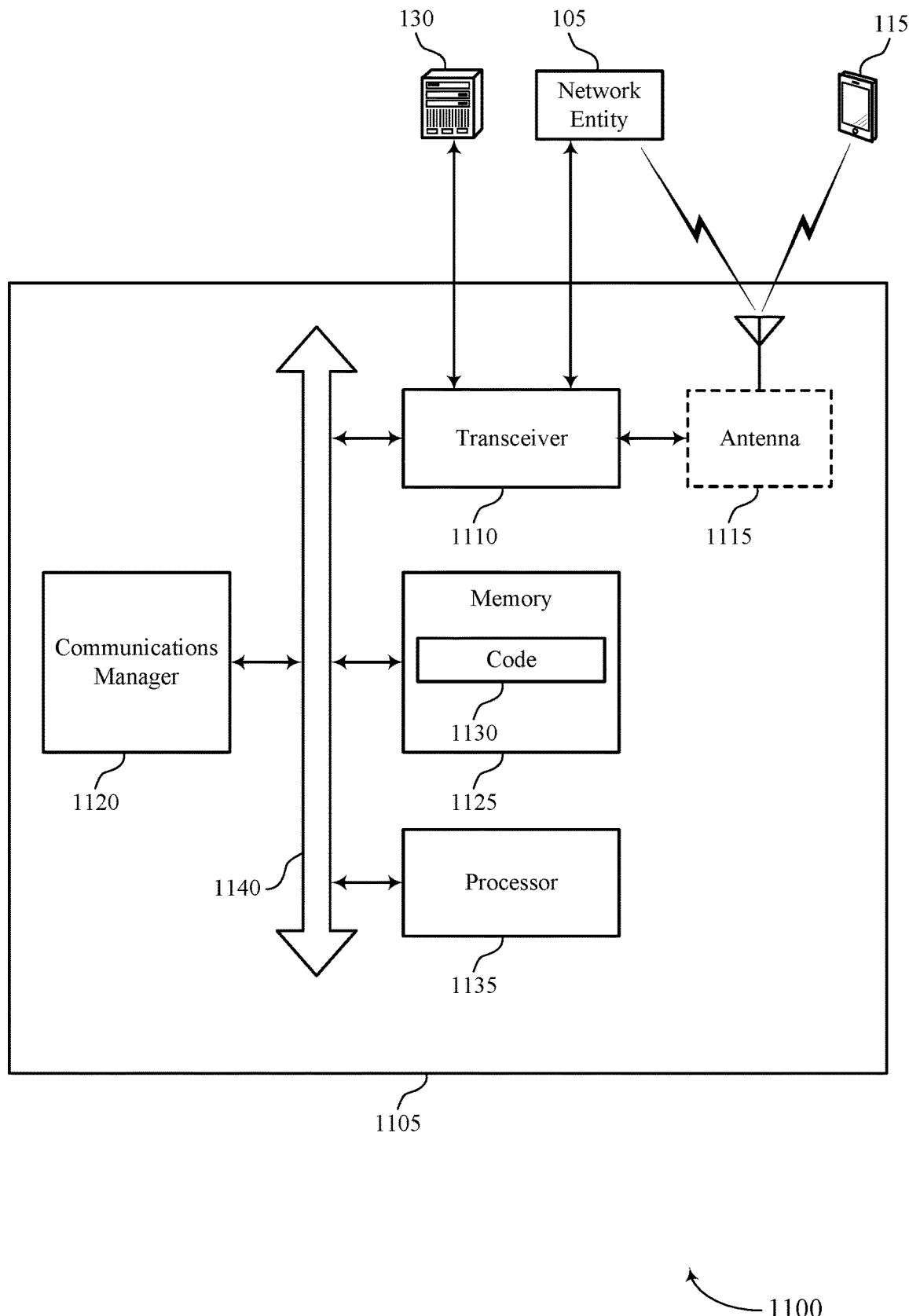
FIG. 11 shows a diagram of a system including a device that supports timing synchronization for non-terrestrial network communications in accordance with one or more aspects of the present disclosure.

FIG. 11 shows a diagram of a system 1100 including a device 1105 that supports timing synchronization for non-terrestrial network communications in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting timing synchronization for non-terrestrial network communications). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network node associated with a first non-terrestrial network cell in accordance with examples as disclosed herein. For example, the communications manager 1120 may be configured as or otherwise support a means for determining one or more timing parameters of a second non-terrestrial network cell different from the first non-terrestrial network cell. The communications manager 1120 may be configured as or otherwise support a means for transmitting a message indicating cell synchronization information for the second non-terrestrial network cell, the cell synchronization information indicating whether the first non-terrestrial network cell and the second non-terrestrial network cell are synchronized at a reference point based on the one or more timing parameters.

By including or configuring the communications manager 1120 in accordance with examples as described herein, the device 1105 may support techniques for timing synchronization for non-terrestrial networks with improved communication reliability, improved coordination between devices, and reduced power consumption.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of timing synchronization for non-terrestrial network communications as described herein, or the processor 1135 and the memory 1125 may be otherwise configured to perform or support such operations.

Figure 12:
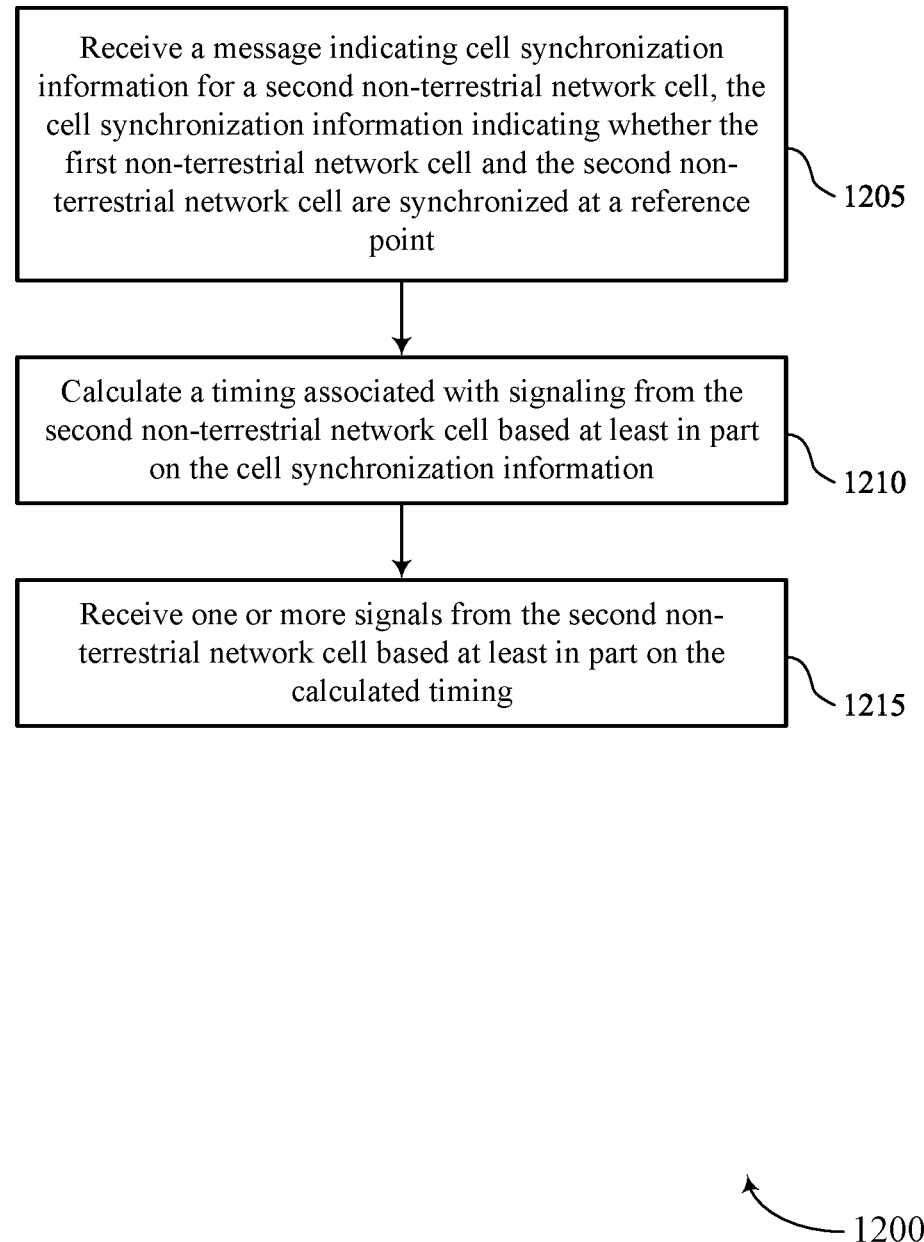
FIGS. 12 through 17 show flowcharts illustrating methods that support timing synchronization for non-terrestrial network communications in accordance with one or more aspects of the present disclosure.

FIG. 12 shows a flowchart illustrating a method 1200 that supports timing synchronization for non-terrestrial network communications in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a message indicating cell synchronization information for a second non-terrestrial network cell, the cell synchronization information indicating whether the first non-terrestrial network cell and the second non-terrestrial network cell are synchronized at a reference point. The operations of 1205 may be performed in accordance with examples as disclosed herein. In some examples, aspects of the operations of 1205 may be performed by a synchronization component 625 as described with reference to FIG. 6.

At 1210, the method may include calculating a timing associated with signaling from the second non-terrestrial network cell based on the cell synchronization information. The operations of 1210 may be performed in accordance with examples as disclosed herein. In some examples, aspects of the operations of 1210 may be performed by a timing component 630 as described with reference to FIG. 6.

At 1215, the method may include receiving one or more signals from the second non-terrestrial network cell based on the calculated timing. The operations of 1215 may be performed in accordance with examples as disclosed herein. In some examples, aspects of the operations of 1215 may be performed by a signal monitoring component 635 as described with reference to FIG. 6.

Figure 13:
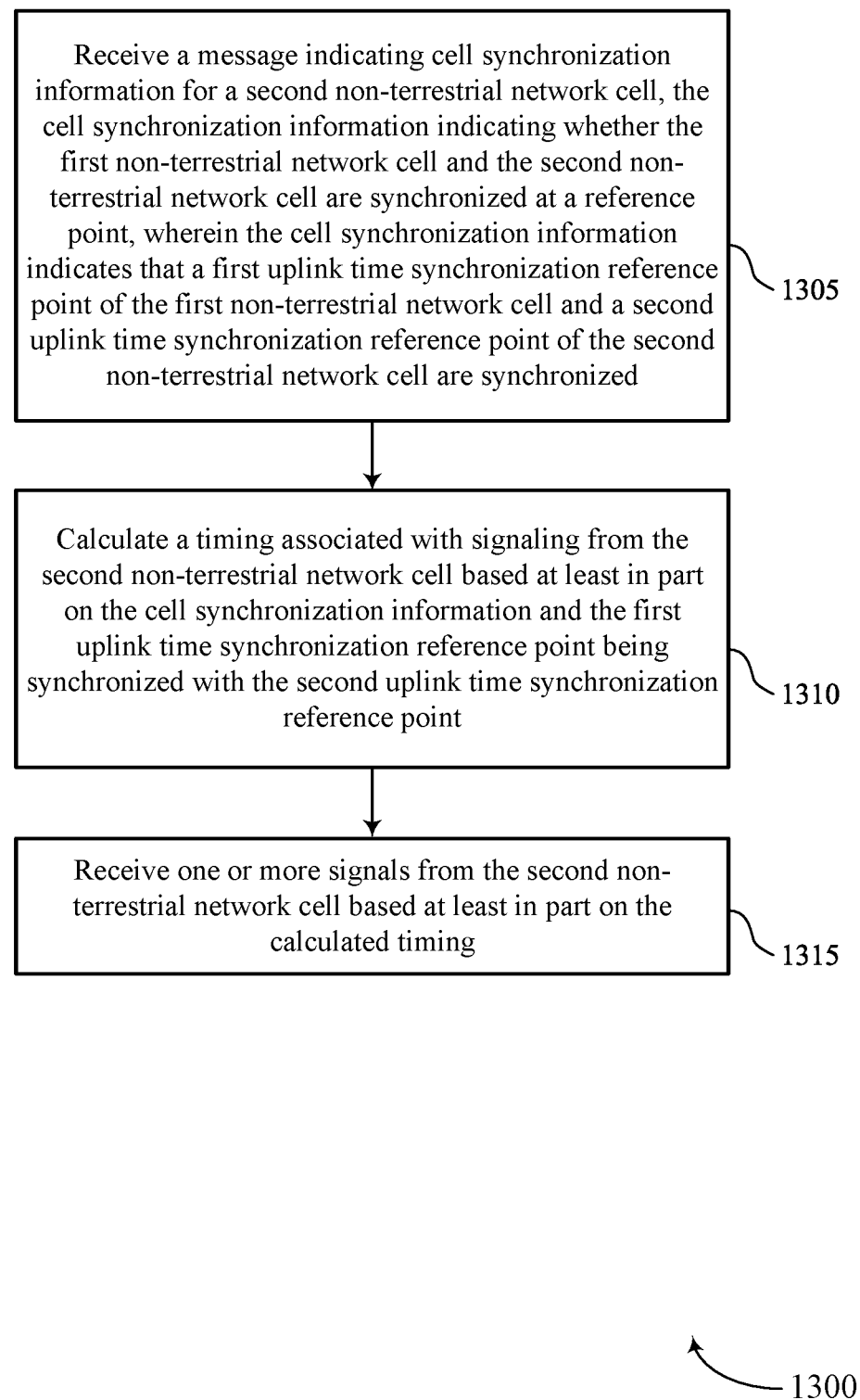

FIG. 13 shows a flowchart illustrating a method 1300 that supports timing synchronization for non-terrestrial network communications in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a message indicating cell synchronization information for a second non-terrestrial network cell, the cell synchronization information indicating whether the first non-terrestrial network cell and the second non-terrestrial network cell are synchronized at a reference point, where the cell synchronization information indicates that a first uplink time synchronization reference point of the first non-terrestrial network cell and a second uplink time synchronization reference point of the second non-terrestrial network cell are synchronized. The operations of 1305 may be performed in accordance with examples as disclosed herein. In some examples, aspects of the operations of 1305 may be performed by a synchronization component 625 as described with reference to FIG. 6.

At 1310, the method may include calculating a timing associated with signaling from the second non-terrestrial network cell based on the cell synchronization information and the first uplink time synchronization reference point being synchronized with the second uplink time synchronization reference point. The operations of 1310 may be performed in accordance with examples as disclosed herein. In some examples, aspects of the operations of 1310 may be performed by a timing component 630 as described with reference to FIG. 6.

At 1315, the method may include receiving one or more signals from the second non-terrestrial network cell based on the calculated timing. The operations of 1315 may be performed in accordance with examples as disclosed herein. In some examples, aspects of the operations of 1315 may be performed by a signal monitoring component 635 as described with reference to FIG. 6.

Figure 14:
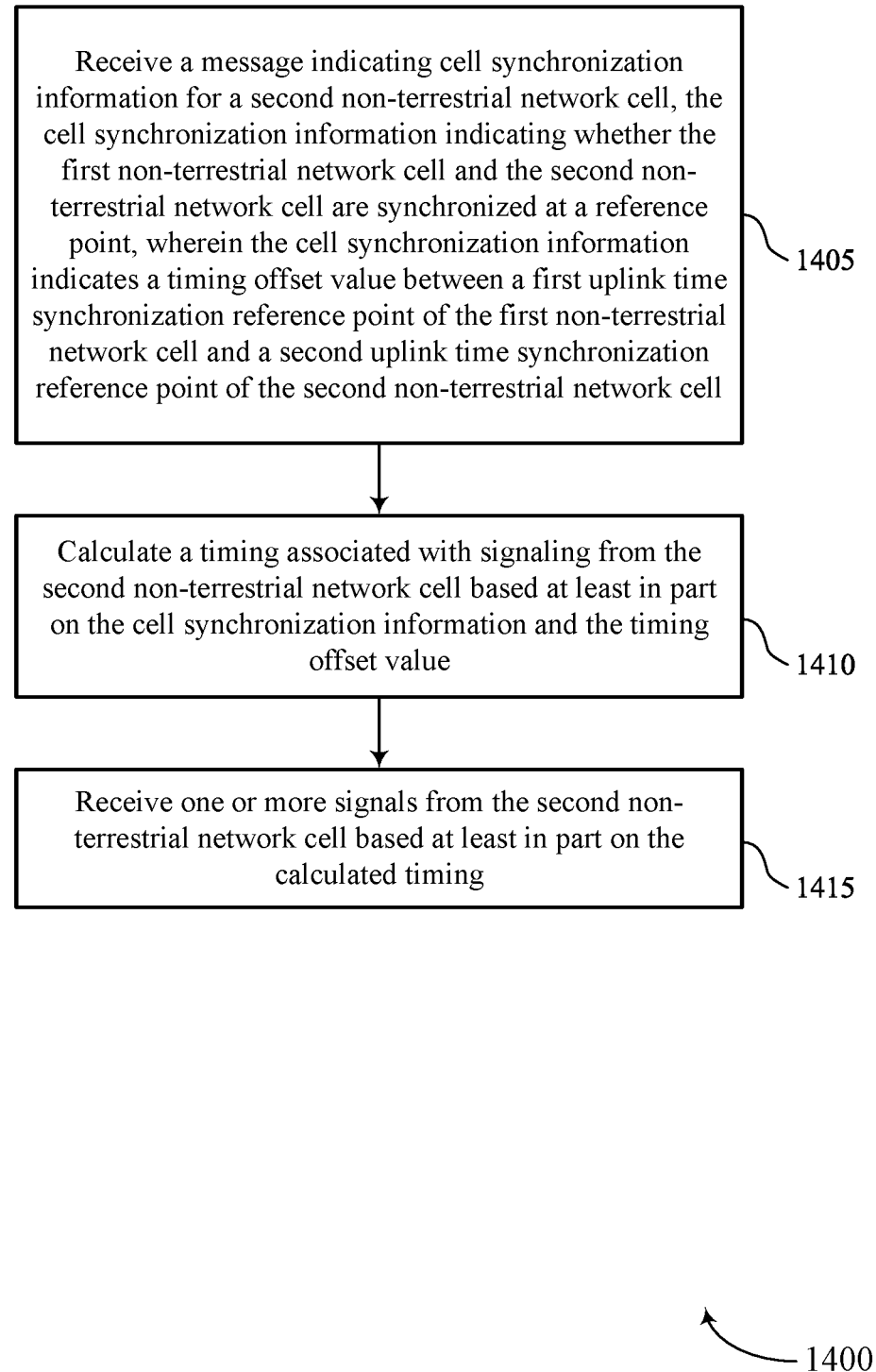

FIG. 14 shows a flowchart illustrating a method 1400 that supports timing synchronization for non-terrestrial network communications in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving a message indicating cell synchronization information for a second non-terrestrial network cell, the cell synchronization information indicating whether the first non-terrestrial network cell and the second non-terrestrial network cell are synchronized at a reference point, where the cell synchronization information indicates a timing offset between a first uplink time synchronization reference point of the first non-terrestrial network cell and a second uplink time synchronization reference point of the second non-terrestrial network cell.

The operations of 1405 may be performed in accordance with examples as disclosed herein. In some examples, aspects of the operations of 1405 may be performed by a synchronization component 625 as described with reference to FIG. 6.

At 1410, the method may include calculating a timing associated with signaling from the second non-terrestrial network cell based on the cell synchronization information and the timing offset value. The operations of 1410 may be performed in accordance with examples as disclosed herein. In some examples, aspects of the operations of 1410 may be performed by a timing component 630 as described with reference to FIG. 6.

At 1415, the method may include receiving one or more signals from the second non-terrestrial network cell based on the calculated timing. The operations of 1415 may be performed in accordance with examples as disclosed herein. In some examples, aspects of the operations of 1415 may be performed by a signal monitoring component 635 as described with reference to FIG. 6.

Figure 15:
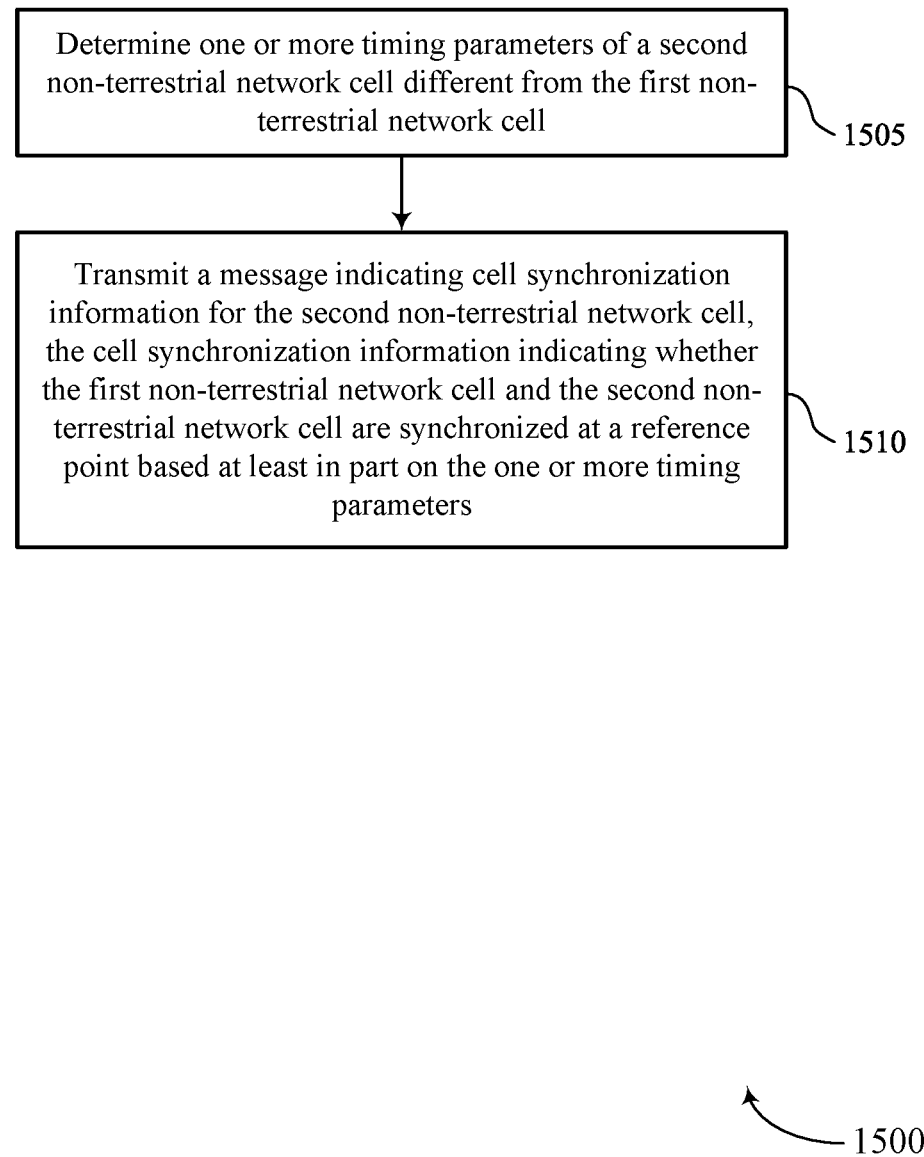

FIG. 15 shows a flowchart illustrating a method 1500 that supports timing synchronization for non-terrestrial network communications in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include determining one or more timing parameters of a second non-terrestrial network cell different from the first non-terrestrial network cell. The operations of 1505 may be performed in accordance with examples as disclosed herein. In some examples, aspects of the operations of 1505 may be performed by a timing parameter manager 1025 as described with reference to FIG. 10.

At 1510, the method may include transmitting a message indicating cell synchronization information for the second non-terrestrial network cell, the cell synchronization information indicating whether the first non-terrestrial network cell and the second non-terrestrial network cell are synchronized at a reference point based on the one or more timing parameters. The operations of 1510 may be performed in accordance with examples as disclosed herein. In some examples, aspects of the operations of 1510 may be performed by a synchronization information transmitter 1030 as described with reference to FIG. 10.

Figure 16:
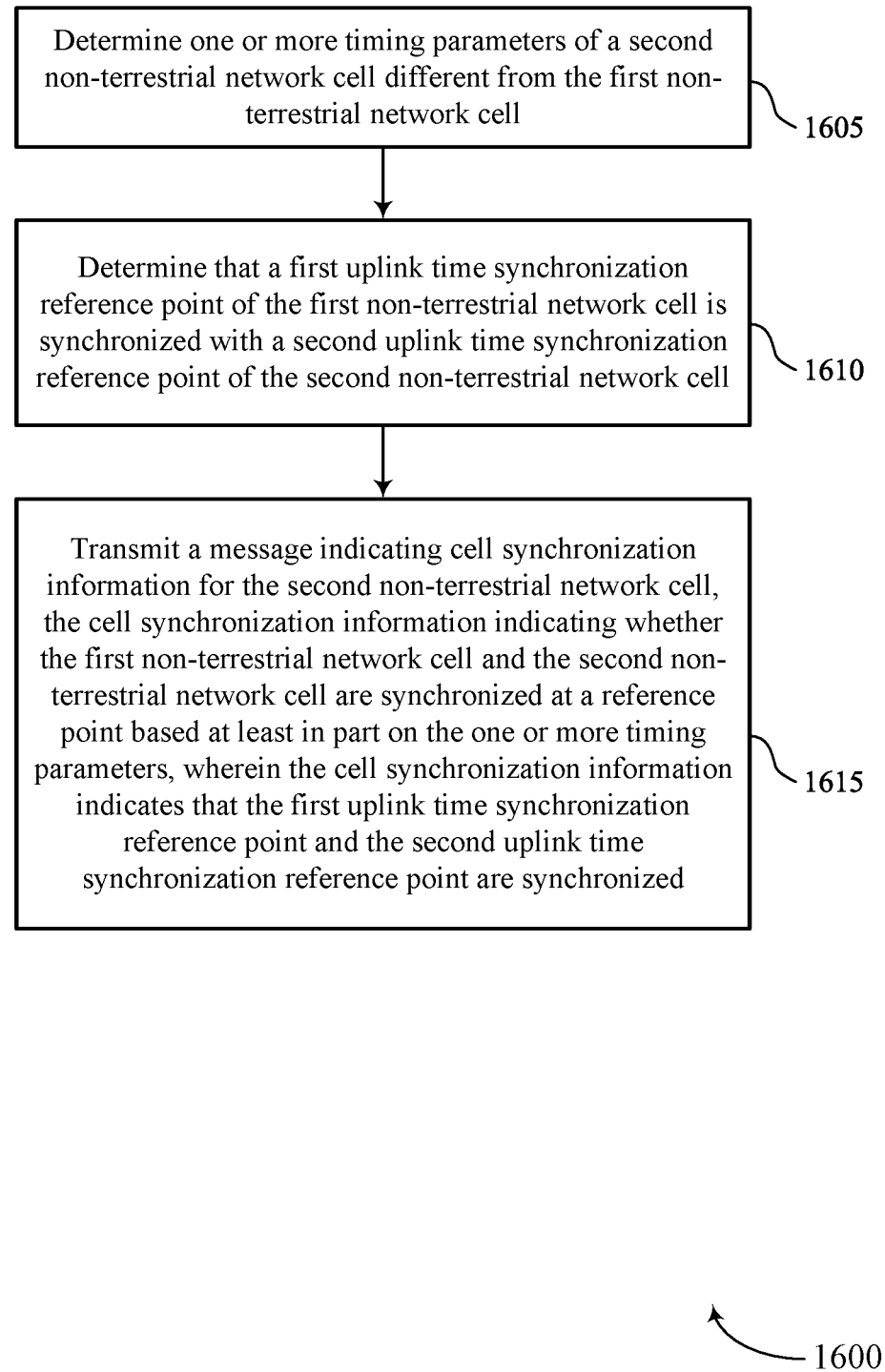

FIG. 16 shows a flowchart illustrating a method 1600 that supports timing synchronization for non-terrestrial network communications in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include determining one or more timing parameters of a second non-terrestrial network cell different from the first non-terrestrial network cell. The operations of 1605 may be performed in accordance with examples as disclosed herein. In some examples, aspects of the operations of 1605 may be performed by a timing parameter manager 1025 as described with reference to FIG. 10.

At 1610, the method may include determining that a first uplink time synchronization reference point of the first non-terrestrial network cell is synchronized with a second uplink time synchronization reference point of the second non-terrestrial network cell. The operations of 1610 may be performed in accordance with examples as disclosed herein. In some examples, aspects of the operations of 1610 may be performed by a reference point manager 1035 as described with reference to FIG. 10.

At 1615, the method may include transmitting a message indicating cell synchronization information for the second non-terrestrial network cell, the cell synchronization information indicating whether the first non-terrestrial network cell and the second non-terrestrial network cell are synchronized at a reference point based on the one or more timing parameters, where the cell synchronization information indicates that the first uplink time synchronization reference point and the second uplink time synchronization reference point are synchronized. The operations of 1615 may be performed in accordance with examples as disclosed herein. In some examples, aspects of the operations of 1615 may be performed by a synchronization information transmitter 1030 as described with reference to FIG. 10.

Figure 17:
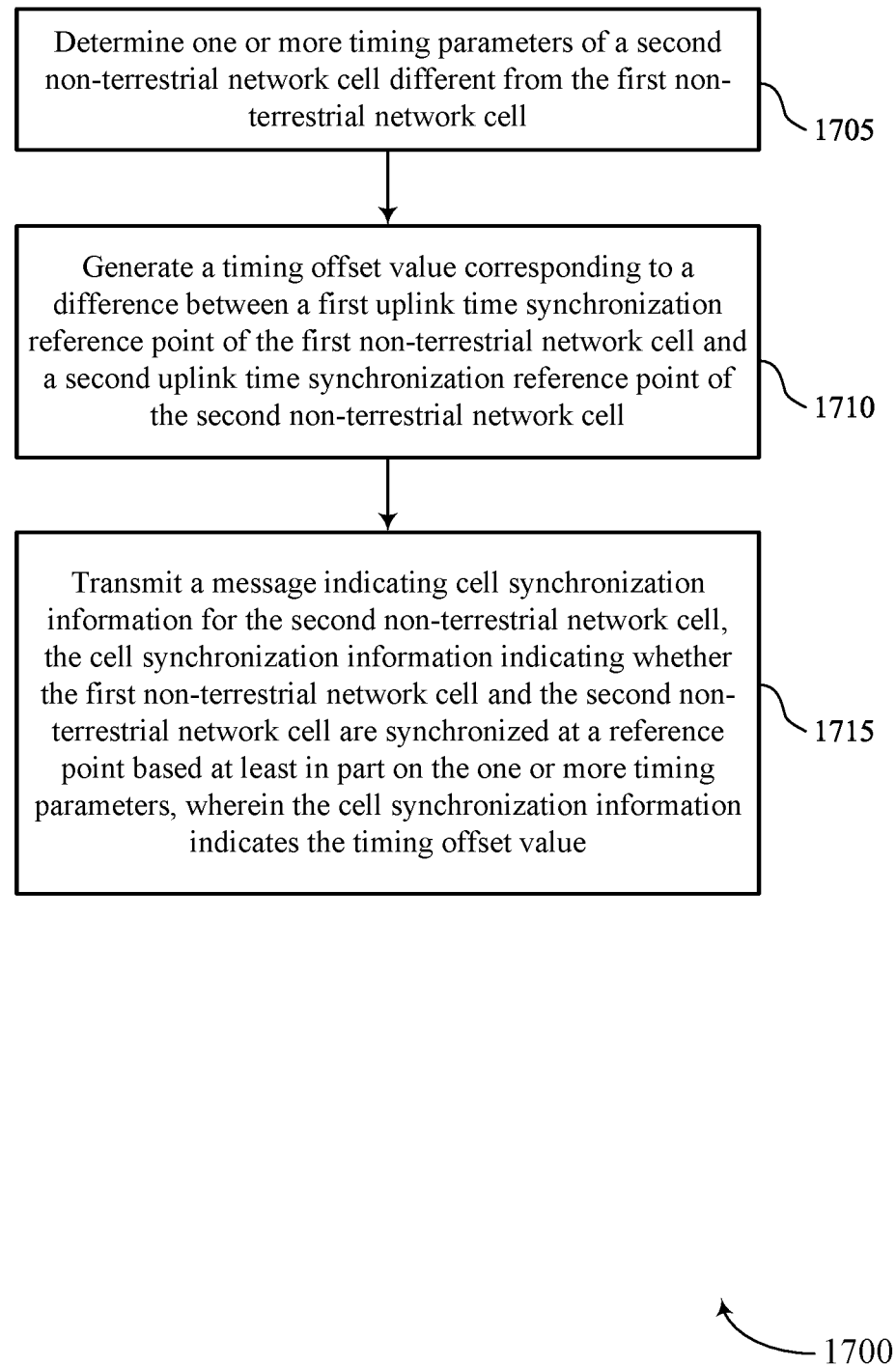

FIG. 17 shows a flowchart illustrating a method 1700 that supports timing synchronization for non-terrestrial network communications in accordance with one or more aspects of the present disclosure. The operations of the method 1700 may be implemented by a network entity or its components as described herein. For example, the operations of the method 1700 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1705, the method may include determining one or more timing parameters of a second non-terrestrial network cell different from the first non-terrestrial network cell. The operations of 1705 may be performed in accordance with examples as disclosed herein. In some examples, aspects of the operations of 1705 may be performed by a timing parameter manager 1025 as described with reference to FIG. 10.

At 1710, the method may include generating a timing offset value corresponding to a difference between a first uplink time synchronization reference point of the first non-terrestrial network cell and a second uplink time synchronization reference point of the second non-terrestrial network cell. The operations of 1710 may be performed in accordance with examples as disclosed herein. In some examples, aspects of the operations of 1710 may be performed by a timing offset manager 1040 as described with reference to FIG. 10.

At 1715, the method may include transmitting a message indicating cell synchronization information for the second non-terrestrial network cell, the cell synchronization information indicating whether the first non-terrestrial network cell and the second non-terrestrial network cell are synchronized at a reference point based on the one or more timing parameters, where the cell synchronization information indicates the timing offset value. The operations of 1715 may be performed in accordance with examples as disclosed herein. In some examples, aspects of the operations of 1715 may be performed by a synchronization information transmitter 1030 as described with reference to FIG. 10.

The following provides an overview of aspects of the present disclosure:

Aspect 1: A method for wireless communication at a UE in communication with a first non-terrestrial network cell, comprising: receiving a message indicating cell synchronization information for a second non-terrestrial network cell, the cell synchronization information indicating whether the first non-terrestrial network cell and the second non-terrestrial network cell have synchronized timing parameters; calculating a timing associated with signaling from the second non-terrestrial network cell based at least in part on the cell synchronization information; and monitoring for one or more signals from the second non-terrestrial network cell based at least in part on the calculated timing.

Aspect 2: The method of aspect 1, wherein calculating the timing comprises: calculating the timing based at least in part on a first uplink time synchronization reference point of the first non-terrestrial network cell being synchronized with a second uplink time synchronization reference point of the second non-terrestrial network cell, wherein the cell synchronization information indicates that the first uplink time synchronization reference point and the second uplink time synchronization reference point are synchronized.

Aspect 3: The method of aspect 1, wherein calculating the timing comprises: calculating the timing based at least in part on a timing offset value between a first uplink time synchronization reference point of the first non-terrestrial network cell and a second uplink time synchronization reference point of the second non-terrestrial network cell, wherein the cell synchronization information indicates the timing offset.

Aspect 4: The method of aspect 3, wherein the timing offset value comprises a system frame number, a subframe, a slot number, or any combination thereof.

Aspect 5: The method of any of aspects 1 through 4, wherein receiving the message comprises: receiving the message from the first non-terrestrial network cell, the message comprising a measurement object configuration for a set of one or more non-terrestrial network cells including the second non-terrestrial network cell.

Aspect 6: The method of any of aspects 1, 2, and 5, further comprising: determining that a first uplink time synchronization reference point of the first non-terrestrial network cell is synchronized with a second uplink time synchronization reference point of the second non-terrestrial network cell based at least in part on the message excluding an indication of a timing offset value.

Aspect 7: The method of aspect 1, wherein calculating the timing comprises: calculating the timing based at least in part on a timing difference between downlink transmissions of the first non-terrestrial network cell and downlink transmissions of the second non-terrestrial network cell, the timing difference being based at least in part on a first reference point of the first non-terrestrial network cell and a second reference point of the second non-terrestrial network cell, wherein the cell synchronization information indicates the timing difference.

Aspect 8: The method of aspect 7, wherein the first reference point comprises a first satellite, or a first platform, or both, providing a first service link for the first non-terrestrial network cell; and the second reference point comprises a second satellite, or a second platform, or both, providing a second service link for the second non-terrestrial network cell, the second service link being different from the first service link.

Aspect 9: The method of any of aspect 1, wherein calculating the timing comprises: calculating the timing based at least in part on a timing offset between a first synchronization signal block arrival time at a first network node of the first non-terrestrial network cell and a second synchronization signal block arrival time at a second network node of the second non-terrestrial network cell, wherein the cell synchronization information indicates the timing offset.

Aspect 10: The method of aspect 9, wherein the timing offset is based at least in part on an epoch time of the first network node, a reference time, or both.

Aspect 11: The method of any of aspects 9 through 10, wherein the first network node comprises a first satellite or a first platform providing a first service link for the first non-terrestrial network cell; and the second network node comprises a second satellite or a second platform providing a second service link for the second non-terrestrial network cell, the second service link being different from the first service link.

Aspect 12: The method of any of aspects 1 through 11, wherein calculating the timing comprises: calculating the timing based at least in part on a transmission time for synchronization signal blocks transmitted by a network node associated with the second non-terrestrial network cell, wherein the cell synchronization information indicates the transmission time.

Aspect 13: The method of aspect 12, wherein the transmission time indicates a system frame number and a subframe based at least in part on a timing of the first non-terrestrial network cell.

Aspect 14: The method of any of aspects 1 through 13, wherein the message comprises a radio resource control message from the first non-terrestrial network cell.

Aspect 15: The method of any of aspects 1 through 14, wherein the message comprises a handover message from the second non-terrestrial network cell.

Aspect 16: The method of aspect 15, wherein the message further indicates a reception time associated with a time when the first non-terrestrial network cell received a handover command from the second non-terrestrial network cell prior to the first non-terrestrial network cell transmitting the message to the UE.

Aspect 17: The method of any of aspects 1 through 16, wherein the message comprises a system information message from the first non-terrestrial network cell or the second non-terrestrial network cell.

Aspect 18: A method for wireless communication at a network node associated with a first non-terrestrial network cell, comprising: determining one or more timing parameters of a second non-terrestrial network cell different from the first non-terrestrial network cell; and transmitting a message indicating cell synchronization information for the second non-terrestrial network cell, the cell synchronization information indicating whether the first non-terrestrial network cell and the second non-terrestrial network cell are synchronized at a reference point based at least in part on the one or more timing parameters.

Aspect 19: The method of aspect 18, wherein determining the one or more timing parameters comprises: determining that a first uplink time synchronization reference point of the first non-terrestrial network cell is synchronized with a second uplink time synchronization reference point of the second non-terrestrial network cell, wherein the cell synchronization information indicates that the first uplink time synchronization reference point and the second uplink time synchronization reference point are synchronized.

Aspect 20: The method of aspect 18, wherein determining the one or more timing parameters comprises: generating a timing offset value corresponding to a difference between a first uplink time synchronization reference point of the first non-terrestrial network cell and a second uplink time synchronization reference point of the second non-terrestrial network cell, wherein the cell synchronization information indicates the timing offset value.

Aspect 21: The method of aspect 20, wherein the timing offset value comprises a system frame number, a subframe, a slot number, or any combination thereof.

Aspect 22: The method of any of aspects 20 through 21, wherein the message comprises a measurement object configuration for a set of one or more non-terrestrial network cells including the second non-terrestrial network cell.

Aspect 23: The method of aspect 18, wherein determining the one or more timing parameters comprises: calculating a timing difference between downlink transmissions of the first non-terrestrial network cell and downlink transmissions of the second non-terrestrial network cell, the timing difference being based at least in part on a first reference point of the first non-terrestrial network cell and a second reference point of the second non-terrestrial network cell, wherein the cell synchronization information indicates the timing difference.

Aspect 24: The method of aspect 23, wherein the first reference point comprises a first satellite, or a first platform, or both, providing a first service link for the first non-terrestrial network cell; and the second reference point comprises a second satellite, or a second platform, or both, providing a second service link for the second non-terrestrial network cell, the second service link being different from the first service link.

Aspect 25: The method of aspect 18, wherein determining the one or more timing parameters comprises: determining a timing offset between a first synchronization signal block arrival time at a first network node of the first non-terrestrial network cell and a second synchronization signal block arrival time at a second network node of the second non-terrestrial network cell, wherein the cell synchronization information indicates the timing offset.

Aspect 26: The method of aspect 25, wherein the timing offset is based at least in part on an epoch time of the first network node, a reference time, or both.

Aspect 27: The method of any of aspects 25 through 26, wherein the first network node comprises a first satellite or a first platform providing a first service link for the first non-terrestrial network cell; and the second network node comprises a second satellite or a second platform providing a second service link for the second non-terrestrial network cell, the second service link being different from the first service link.

Aspect 28: The method of any of aspects 18 through 27, wherein determining the one or more timing parameters comprises: determining a transmission time for synchronization signal blocks transmitted by a second network node associated with the second non-terrestrial network cell, wherein the cell synchronization information indicates the transmission time, the transmission time indicating a system frame number and a subframe based at least in part on a timing of the first non-terrestrial network cell.

Aspect 29: An apparatus for wireless communication at a UE in communication with a first non-terrestrial network cell, comprising a processor; memory coupled with the processor; and instructions stored in the memory and executable by the processor to cause the apparatus to perform a method of any of aspects 1 through 17.

Aspect 30: An apparatus for wireless communication at a UE in communication with a first non-terrestrial network cell, comprising at least one means for performing a method of any of aspects 1 through 17.

Aspect 31: A non-transitory computer-readable medium storing code for wireless communication at a UE in communication with a first non-terrestrial network cell, the code comprising instructions executable by a processor to perform a method of any of aspects 1 through 17.

Aspect 32: An apparatus for wireless communication at a network node associated with a first non-terrestrial network cell, comprising a processor; memory coupled with the processor; and instructions stored in the memory and executable by the processor to cause the apparatus to perform a method of any of aspects 18 through 28.

Aspect 33: An apparatus for wireless communication at a network node associated with a first non-terrestrial network cell, comprising at least one means for performing a method of any of aspects 18 through 28.

Aspect 34: A non-transitory computer-readable medium storing code for wireless communication at a network node associated with a first non-terrestrial network cell, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE) in communication with a first non-terrestrial network cell, comprising:
   receiving a message indicating cell synchronization information for a second non-terrestrial network cell, the cell synchronization information indicating that a first uplink time synchronization reference point of the first non-terrestrial network cell and a second uplink time synchronization reference point of the second non-terrestrial network cell are synchronized;
   calculating a timing associated with signaling from the second non-terrestrial network cell based at least in part on the first uplink time synchronization reference point being synchronized with the second uplink time synchronization reference point; and
   receiving one or more signals from the second non-terrestrial network cell based at least in part on the calculated timing.

2. The method of claim 1, further comprising:
   determining that the first uplink time synchronization reference point of the first non-terrestrial network cell is synchronized with the second uplink time synchronization reference point of the second non-terrestrial network cell based at least in part on the message excluding an indication of a timing offset value.

3. The method of claim 1, wherein calculating the timing comprises:
   calculating the timing based at least in part on a transmission time for synchronization signal blocks transmitted by a network node associated with the second non-terrestrial network cell, wherein the cell synchronization information indicates the transmission time.

4. The method of claim 3, wherein the transmission time indicates a system frame number and a subframe based at least in part on a timing of the first non-terrestrial network cell.

5. The method of claim 1, wherein the message comprises a radio resource control message from the first non-terrestrial network cell.

6. The method of claim 1, wherein the message comprises a handover message from the second non-terrestrial network cell.

7. The method of claim 6, wherein the message further indicates a reception time associated with a time when the first non-terrestrial network cell received a handover command from the second non-terrestrial network cell prior to the first non-terrestrial network cell transmitting the message to the UE.

8. The method of claim 1, wherein the message comprises a system information message from the first non-terrestrial network cell or the second non-terrestrial network cell.

9. A method for wireless communication at a network node associated with a first non-terrestrial network cell, comprising:
   determining one or more timing parameters of a second non-terrestrial network cell different from the first non-terrestrial network cell; and
   transmitting a message indicating cell synchronization information for the second non-terrestrial network cell, the cell synchronization information indicating that a first uplink time synchronization reference point of the first non-terrestrial network cell and a second uplink time synchronization reference point of the second non-terrestrial network cell are synchronized based at least in part on the one or more timing parameters.

10. The method of claim 9, wherein determining the one or more timing parameters comprises:
   determining a transmission time for synchronization signal blocks transmitted by a second network node associated with the second non-terrestrial network cell, wherein the cell synchronization information indicates the transmission time, the transmission time indicating a system frame number and a subframe based at least in part on a timing of the first non-terrestrial network cell.

11. A user equipment (UE) for wireless communication in communication with a first non-terrestrial network cell, comprising:
   one or more memories storing processor-executable code; and
   one or more processors coupled with the one or more memories and individually or collectively operable to execute the code to cause the UE to:
      receive a message indicating cell synchronization information for a second non-terrestrial network cell, the cell synchronization information indicating that a first uplink time synchronization reference point of the first non-terrestrial network cell and a second uplink time synchronization reference point of the second non-terrestrial network cell are synchronized;
      calculate a timing associated with signaling from the second non-terrestrial network cell based at least in part on the first uplink time synchronization reference point being synchronized with the second uplink time synchronization reference point; and
      receive one or more signals from the second non-terrestrial network cell based at least in part on the calculated timing.

12. The UE of claim 11, wherein the one or more processors are individually or collectively operable to execute the code to cause the UE to:
   determine that the first uplink time synchronization reference point of the first non-terrestrial network cell is synchronized with the second uplink time synchronization reference point of the second non-terrestrial network cell based at least in part on the message excluding an indication of a timing offset value.

13. The UE of claim 11, wherein, to calculate the timing, the one or more processors are individually or collectively operable to execute the code to cause the UE to:
   calculate the timing based at least in part on a transmission time for synchronization signal blocks transmitted by a network node associated with the second non-terrestrial network cell, wherein the cell synchronization information indicates the transmission time.

14. The UE of claim 13, wherein the transmission time indicates a system frame number and a subframe based at least in part on a timing of the first non-terrestrial network cell.

15. The UE of claim 11, wherein the message comprises a radio resource control message from the first non-terrestrial network cell.

16. The UE of claim 11, wherein the message comprises a handover message from the second non-terrestrial network cell.

17. The UE of claim 16, wherein the message further indicates a reception time associated with a time when the first non-terrestrial network cell received a handover command from the second non-terrestrial network cell prior to the first non-terrestrial network cell transmitting the message to the UE.

18. The UE of claim 11, wherein the message comprises a system information message from the first non-terrestrial network cell or the second non-terrestrial network cell.

19. A network node associated with a first non-terrestrial network cell for wireless communication, comprising:
   one or more memories storing processor-executable code; and
   one or more processors coupled with the one or more memories and individually or collectively operable to execute the code to cause the network node to:
      determine one or more timing parameters of a second non-terrestrial network cell different from the first non-terrestrial network cell; and
      transmit a message indicating cell synchronization information for the second non-terrestrial network cell, the cell synchronization information indicating that a first uplink time synchronization reference point of the first non-terrestrial network cell and a second uplink time synchronization reference point of the second non-terrestrial network cell are synchronized based at least in part on the one or more timing parameters.

20. The network node of claim 19, wherein, to determine the one or more timing parameters, the one or more processors are individually or collectively operable to execute the code to cause the network node to:
   determine a transmission time for synchronization signal blocks transmitted by a second network node associated with the second non-terrestrial network cell, wherein the cell synchronization information indicates the transmission time, the transmission time indicating a system frame number and a subframe based at least in part on a timing of the first non-terrestrial network cell.

* * * * *